(12) United States Patent
Chen et al.

(10) Patent No.: US 11,222,620 B2
(45) Date of Patent: Jan. 11, 2022

(54) SPEECH RECOGNITION USING UNSPOKEN TEXT AND SPEECH SYNTHESIS

(71) Applicant: Google LLC, Mountain View, CA (US)

(72) Inventors: Zhehuai Chen, Jersey City, NJ (US); Andrew M. Rosenberg, Brooklyn, NY (US); Bhuvana Ramabhadran, Mt. Kisco, NY (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/869,552

(22) Filed: May 7, 2020

(65) Prior Publication Data

US 2021/0350786 A1 Nov. 11, 2021

(51) Int. Cl.
*G10L 15/26* (2006.01)
*G10L 13/00* (2006.01)
*G10L 13/08* (2013.01)
*G10L 15/06* (2013.01)

(52) U.S. Cl.
CPC .............. *G10L 13/00* (2013.01); *G10L 13/08* (2013.01); *G10L 15/063* (2013.01)

(58) Field of Classification Search
None
See application file for complete search history.

(56) References Cited

U.S. PATENT DOCUMENTS

| | | | |
|---|---|---|---|
| 10,671,838 B1 * | 6/2020 | Bogan, III | G06T 13/80 |
| 10,783,875 B2 * | 9/2020 | Hosseini-Asl | G10L 15/063 |
| 11,017,761 B2 * | 5/2021 | Peng | G10L 13/047 |
| 2019/0130903 A1 * | 5/2019 | Sriram | G10L 15/063 |
| 2019/0180732 A1 * | 6/2019 | Ping | G06F 9/30003 |
| 2019/0251952 A1 * | 8/2019 | Arik | G10L 13/033 |
| 2020/0243094 A1 * | 7/2020 | Thomson | G10L 15/26 |
| 2020/0335086 A1 * | 10/2020 | Paraskevopoulos | G10L 25/63 |
| 2020/0335108 A1 * | 10/2020 | Meng | G10L 17/18 |
| 2021/0074260 A1 * | 3/2021 | Gopala | G10L 13/10 |
| 2021/0074305 A1 * | 3/2021 | Gopala | G06F 21/30 |
| 2021/0075806 A1 * | 3/2021 | Gopala | G10L 13/08 |

* cited by examiner

*Primary Examiner* — Jakieda R Jackson
(74) *Attorney, Agent, or Firm* — Honigman LLP; Brett A. Krueger; Grant Griffith

(57) ABSTRACT

A method for training a generative adversarial network (GAN)-based text-to-speech (TTS) model and a speech recognition model in unison includes obtaining a plurality of training text utterances. At each of a plurality of output steps for each training text utterance, the method also includes generating, for output by the GAN-Based TTS model, a synthetic speech representation of the corresponding training text utterance, and determining, using an adversarial discriminator of the GAN, an adversarial loss term indicative of an amount of acoustic noise disparity in one of the non-synthetic speech representations selected from the set of spoken training utterances relative to the corresponding synthetic speech representation of the corresponding training text utterance. The method also includes updating parameters of the GAN-based TTS model based on the adversarial loss term determined at each of the plurality of output steps for each training text utterance of the plurality of training text utterances.

30 Claims, 9 Drawing Sheets

SPEECH RECOGNITION USING UNSPOKEN TEXT AND SPEECH SYNTHESIS

TECHNICAL FIELD

This disclosure relates to speech recognition using unspoken text and speech synthesis

BACKGROUND

Automatic speech recognition (ASR), the process of taking an audio input and transcribing it into text, has greatly been an important technology that is used in mobile devices and other devices, in general, automatic speech recognition attempts to provide accurate transcriptions of what a person has said by taking an audio input (e.g., speech utterance) and transcribing the audio input into text. Modem ASR models continue to improve in both accuracy (e.g. a low word error rate (WER)) and latency (e.g., delay between the user speaking and the transcription) based on the ongoing development of deep neural networks. However, one challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model. Synthesized speech and/or data-augmented speech can incorporated to increase the volume of training data used to train the ASR models, as well as increase linguistic diversity when speech is synthesized from unspoken text which can be obtained easily and cheaply for on-the fly training of an ASR model.

SUMMARY

One aspect of the disclosure provides a method for training a generative adversarial network (GAN)-based text-to-speech (TTS) model and a speech recognition model in unison. The method Includes obtaining, by data processing hardware, a plurality of training text utterances, wherein a first portion of the plurality of training text utterances includes unspoken text utterances and a remaining second portion of the plurality of training text utterances comprises transcriptions in a set of spoken training utterances. Each unspoken text utterance is not paired with any corresponding spoken utterance. Each spoken training utterance composing a corresponding transcription paired with a corresponding non-synthetic speech representation of the corresponding spoken training utterance. For each of a plurality of output steps for each training text utterance of the plurality of training text utterances, the method also includes: generating, by the data processing hardware, for output by the GAN-based TTS model, a synthetic speech representation of the corresponding training text utterance; and determining, by the data processing hardware, using an adversarial discriminator of the GAN, an adversarial loss term indicative of an amount of acoustic noise disparity in one of the non-synthetic speech representations selected from the set of spoken training utterances relative to the corresponding synthetic speech representation of the corresponding training text utterance. The method also includes updating, by the data processing hardware, parameters of the GAN-based TTS model based on the adversarial loss term determined at each of the plurality of output steps for each training text utterance of the plurality of training text utterances. The method also Includes training, by the data processing hardware, the speech recognition model on the synthetic speech representation generated at each of the plurality of output steps for each training text utterance of the plurality of training text utterances.

Implementations of the disclosure may include one or more of the following optional features. In some implementations, training the speech recognition model further includes training the speech recognition model on training utterance batches. Here, each training utterance batch includes: a portion of the generated synthetic speech representations of the corresponding training text utterances; and a portion of the non-synthetic speech representations in the set of spoken training utterances. A ratio of the portion of the generated synthetic speech representations to the portion of the non-synthetic speech, representations in each training utterance batch increases over time while training the speech recognition model.

In the implementations when the speech, recognition model is trained on training utterance batches, the method may also optionally include, while training the speech recognition model on each training utterance batch: generating, by the data processing hardware, a respective non-synthetic speech loss term for each non-synthetic speech representation in the portion of the non-synthetic speech representations for the corresponding training utterance batch; and applying, by the data processing hardware, an adjustable loss weight to each respective non-synthetic speech loss term generated by the speech recognition model. Here, the adjustable weight has a magnitude proportional to the ratio of the portion of the generated speech representations to the portion of the non-synthetic speech representations in the corresponding training utterance batch.

Moreover, while training the speech recognition model on each training utterance batch, the method may also include, at each of plurality of output steps for each generated synthetic speech representation in the portion of the generated synthetic speech representations associated with the corresponding training utterance hatch: determining, by the data processing hardware, for output by the speech recognition model, a first probability distribution over possible synthetic speech recognition hypotheses for the corresponding synthetic speech representation: and generating, by the data processing hardware, a synthetic speech loss terms based on the first probability distribution over possible synthetic speech recognition hypotheses for the corresponding synthetic speech representation and the corresponding training text utterance from which the corresponding synthetic speech representation is generated. At the same time, the method includes, at each of a plurality of output steps for each non-synthetic speech representation in the portion of the non-synthetic speech representations associated with the corresponding training utterance batch: determining, by the data processing hardware, for output by the speech recognition model, a second probability distribution over possible non-synthetic speech recognition hypotheses for the corresponding non-synthetic speech representations; and generating, by the data processing hardware, a non-synthetic speech loss term based on the second probability distribution over possible non-synthetic speech recognition hypotheses for the corresponding non-synthetic speech representation and the transcription in the set of spoken training utterances that is paired with the corresponding non-synthetic speech representation.

In some examples, at each of the plurality of output steps for each training text utterance of the plurality of training text utterances, the one of the non-synthetic speech representations selected from the set of spoken training utterances includes: a randomly selected non-synthetic speech representation from the set of spoken training utterances when the corresponding training text utterance comprises one of the unspoken text utterances in the first portion of the plurality of training text utterances: or a non-synthetic speech representation from the set of spoken training utterances that is paired with the corresponding one of the transcriptions when the corresponding training text utterance comprises one of the transcriptions in the second portion of the plurality of training text utterances. In additional examples, each training text utterance is conditioned on an utterance embedding selected from a set of utterance embeddings, and a speaker embedding selected from a set of speaker embeddings. Each speaker embedding in the set of speaker embeddings represents speaker characteristics and each utterance embedding in the set of utterance embeddings represents an intended prosody. Each training text utterance may be represented by a corresponding sequence of phonemes, each utterance embedding in the set of utterance embeddings may be extracted from a corresponding one of the transcriptions in the set of spoken training utterances by a variational autoencoder (VAE), and each speaker embedding in the set of speaker embeddings may be extracted from a corresponding one of the non-synthetic speech representations in the set of spoken training utterances.

In some implementations, the method also includes, prior to determining the adversarial loss term at each of the plurality of output steps for each training text utterance of the plurality of training text utterances, applying, by the data processing hardware, data augmentation to the corresponding generated synthetic speech representation of the corresponding training text utterance. In these Implementations, the applied data augmentation may include at least one of adding noise, adding reverberation, or manipulating timing. In additional implementations, the method also includes, at each of the plurality of output steps for each training text utterance of the plurality of training text utterances: generating, by the data processing hardware, for output by a reference TTS model, a reference synthetic speech representation of the corresponding training text utterance; and determining, by the data processing hardware, a consistency loss term based on the synthetic speech representation of the corresponding training text utterance output by the GAN-based TTS model and the reference synthetic speech representation of the corresponding training text utterance output by the reference TTS model. Here, updating the parameters of the GAN-based TTS model is based on the adversarial loss term and the consistency loss term determined at each of the plurality of output steps for each training text utterance of the plurality of unspoken training utterances. The parameters of the reference TTS model may remain fixed at each of the plurality of output steps for each training text utterance of tire plurality of training text utterances.

The method may also include executing, by the data processing hardware, an unspoken text selection process to obtain the unspoken text utterances in the first portion of the plurality of training text utterance. The text selection process is configured to obtain a corpus of unspoken text utterances, and for each unspoken text utterance in the corpus of unspoken text utterances; determine a first probability associated with, the unspoken text utterance appearing in a domain-specific language model, the domain-specific language model trained on each transcription in the set of spoken training utterances; determine a second probability associated with the unspoken text utterance appearing in a background language model, the background language model trained on every unspoken text utterance in the corpus of unspoken text utterances; and determine a score based on the first probability, the second probability, and a number of words appearing in the corresponding unspoken text utterance. The text selection process is further configured to select, as the unspoken text utterances in the first portion of the plurality of training text utterances, the unspoken text utterances in the corpus of unspoken text utterances that have the N-best utterance scores.

In some examples, training the speech recognition model includes, at each of the plurality of output steps for each training text utterance of the plurality of training text utterances: encoding, by the speech recognition model, the synthetic speech representation of the corresponding training text utterance output by the GAN-based TTS model; encoding, by the speech recognition model, one of the non-synthetic speech representations selected from the set of spoken training utterances; determining, using another adversarial discriminator, another adversarial loss term between the encoded synthetic speech representation and the encoded one of the non-synthetic speech representations; and updating parameters of the speech recognition model based on the other adversarial loss term determined at each of the plurality of output steps for each training text utterance of the plurality of training text utterances. In these examples, at each of the plurality of output steps far each training text utterance of the plurality of training text utterances, the corresponding text utterance and the other adversarial discriminator may each conditioned on a same speaker embedding selected from a set of speaker embeddings. Each speaker embedding in the set of speaker embeddings represents speaker characteristics. Further, the one of the non-synthetic speech representations selected from the set of spoken training utterances may include a randomly selected non-synthetic speech representation from the set of spoken training utterances when the corresponding training text utterance comprises one of the unspoken text utterances in the first portion of the plurality of training text utterances, and a non-synthetic speech representation from the set of spoken training utterances that is paired with the corresponding one of the transcriptions when the corresponding training text utterance comprises one of the transcriptions in the second portion of the plurality of training text utterances.

Another aspect of the disclosure provides a system for training a generative adversarial network (GAN)-based text-to-speech (TTS) model and a speech recognition model in unison. The system includes data processing hardware and memory hardware in communication with the data processing hardware. The memory hardware stores instructions that when executed, on the data processing hardware cause the data processing hardware to perform operations. The operations include obtaining a plurality of training text utterances, wherein a first portion of the plurality of training text utterances includes unspoken text utterances and a remaining second portion of the plurality of training text utterances comprises transcriptions in a set of spoken training utterances. Each unspoken text utterance is not paired with any corresponding spoken utterance. Each spoken training utterance comprising a corresponding transcription paired with a corresponding non-synthetic speech representation of the corresponding spoken training utterance. For each of a plurality of output steps for each training text utterance of the plurality of training text utterances, the operations also include generating, tor output by the GAN-based TTS model, a synthetic speech representation of the corresponding training text utterance, and determining, using an adversarial discriminator of the GAN, an adversarial loss term indicative of an amount of acoustic noise disparity in one of the non-synthetic speech representations selected from the set of spoken training utterances relative to the corresponding synthetic speech representation of the corresponding training text utterance. The operations also include updating parameters of the GAN-based TTS model based on the adversarial loss term determined at each of the plurality of output steps for each training text utterance of the plurality of training text utterances, and training This aspect may include one or more of the following optional features. In some implementations, training the speech recognition model further Includes training the speech recognition model on training utterance batches. Here, each training utterance batch includes: a portion of the generated synthetic speech representations of the corresponding training text utterances, and a portion of the non-synthetic speech representations in the set of spoken training utterances, A ratio of the portion of the generated synthetic speech representations to the portion of the non-synthetic speech representations in each training utterance batch increases over time while training the speech recognition model.

In the implementations when the speech recognition model is trained on training utterance batches, the operations may also optionally include, while training the speech recognition model on each training utterance batch: generating a respective non-synthetic speech loss term for each non-synthetic speech representation in the portion of the non-synthetic speech representations for the corresponding training utterance batch; and applying an adjustable loss weight to each respective non-synthetic speech loss term generated by the speech recognition model. Here, the adjustable weight has a magnitude proportional to the ratio of the portion of the generated speech representations to the portion of the non-synthetic speech representations in the corresponding training utterance batch.

Moreover, while training the speech recognition model on each training utterance batch, the operations may also include, at each of plurality of output steps for each generated synthetic speech representation in the portion of the generated synthetic speech representations associated with the corresponding training utterance batch: determining, for output by the speech recognition model, a first probability distribution over possible synthetic speech recognition hypotheses for the corresponding synthetic speeds representation; and generating a synthetic speech loss term based on the first probability distribution over possible synthetic speech recognition hypotheses for the corresponding synthetic speech representation and the corresponding training text utterance from which the corresponding synthetic speech representation is generated. At the same time, the operations include, at each of a plurality of output steps for each non-synthetic speech representation in the portion of the non-synthetic speech representations associated with the corresponding training utterance batch: determining, for output by the speech recognition model, a second probability distribution over possible non-synthetic speech recognition hypotheses for the corresponding non-synthetic speech representations, and generating a non-synthetic speech loss term based on the second probability distribution over possible non-synthetic speech recognition hypotheses for the corresponding non-synthetic speech representation and the transcription in the set of spoken training utterances that is paired with the corresponding non-synthetic speech representation.

In some examples, at each of the plurality of output steps for each training text utterance of the plurality of training text utterances, the one of the non-synthetic speech representations selected from the set of spoken training utterances includes: a randomly selected non-synthetic speech representation from the set of spoken training utterances when the corresponding training text utterance comprises one of the unspoken text utterances in the first portion of the plurality of training text utterances; or a non-synthetic speech representation from the set of spoken training utterances that is paired with the corresponding one of the transcriptions when the corresponding training text utterance comprises one of the transcriptions in the second portion of the plurality of training text utterances. In additional examples, each training text utterance is conditioned on an utterance embedding selected from a set of utterance embeddings, and a speaker embedding selected from a set of speaker embeddings. Each speaker embedding in the set of speaker embeddings represents speaker characteristics and each utterance embedding in the set of utterance embeddings represents an intended prosody. Each training text utterance may be represented by a corresponding sequence of phonemes, each utterance embedding m the set of utterance embeddings may be extracted from a corresponding one of the transcriptions in the set of spoken training utterances by a variational auto-encoder (VAE), and each speaker embedding in the set of speaker embeddings may be extracted from a corresponding one of tire non-synthetic speech representations in the set of spoken training utterances.

In some implementations, the operations also include, prior to determining the adversarial loss term at each of the plurality of output steps tor each training text utterance of the plurality of training text utterances, applying data augmentation to the corresponding generated synthetic speech representation of the corresponding training text utterance. In these implementations, the applied data augmentation may include at least one of adding noise, adding reverberation, or manipulating timing. In additional implementations, the operations also include, at each of the plurality of output steps tor each training text utterance of the plurality of training text utterances: generating, for output by a reference TTS model, a reference synthetic speech representation of the corresponding training text utterance; and determining a consistency loss term based on the synthetic speech representation of the corresponding training text utterance output by the GAN-based TTS model and the reference synthetic speech representation of the corresponding training text utterance output by the reference TTS model. Here, updating the parameters of the GAN-based TTS model is based on the adversarial loss term and the consistency loss term determined at each of the plurality of output steps for each training text utterance of the plurality of unspoken training utterances. The parameters of the reference TTS model may remain fixed at each of the plurality of output steps for each training text utterance of the plurality of training text utterances.

The operations may also include executing an unspoken text selection process to obtain the unspoken text utterances in the first portion of the plurality of training text utterance. The text selection process is configured to obtain a corpus of unspoken text utterances, and for each unspoken text utterance in the corpus of unspoken text utterances: determine a first probability associated with the unspoken text utterance appearing in a domain-specific language model, the domain-specific language model trained on each transcription in the set of spoken training utterances; determine a second probability associated with the unspoken text utterance appearing in a background language model, the background language model trained on every unspoken text utterance in the corpus of unspoken text utterances: and determine a score based on the first probability, the second probability, and a number of words appearing in the corresponding unspoken text utterance. The text selection process is further configured to select as the unspoken text utterances in the first portion of the plurality of training text utterances, the unspoken text utterances in the corpus of unspoken text utterances that have the N-best utterance scores.

In some examples, training the speech recognition model includes, at each of the plurality of output steps for each training text utterance of the plurality of training text utterances: encoding, by the speech recognition model, the synthetic speech representation of the corresponding training text utterance output by the GAN-based TTS model; encoding, by the speech recognition model, one of the non-synthetic speech representations selected from the set of spoken training utterances; determining, using another adversarial discriminator, another adversarial loss term between the encoded synthetic speech representation and the encoded one of the non-synthetic speech representations; and updating parameters of the speech recognition model based on the other adversarial loss term determined at each of the plurality of output steps for each training text utterance of the plurality of training text utterances, in these examples, at each of the plurality of output steps for each training text utterance of the plurality of training text utterances, the corresponding text utterance and the other adversarial discriminator may each conditioned on a same speaker embedding selected from a set of speaker embeddings. Each speaker embedding in the set of speaker embeddings represents speaker characteristics. Further, the one of the non-synthetic speech representations selected from the set of spoken training utterances may include a randomly selected non-synthetic speech representation from the set of spoken training utterances when the corresponding training text utterance comprises one of the unspoken text utterances in the first portion of the plurality of training text utterances, and a non-synthetic speech representation from the set of spoken training utterances that is paired with the corresponding one of the transcriptions when the corresponding training text utterance comprises one of the transcriptions in the second portion of the plurality of training text utterances.

The details of one or more implementations of the disclosure are set forth in the accompanying drawings and the description below. Other aspects, features, and advantages will be apparent from fee description and drawings, and from the claims.

DESCRIPTION OF DRAWINGS

Like reference symbols in the various drawings indicate like elements.

DETAILED DESCRIPTION

Figure 1:
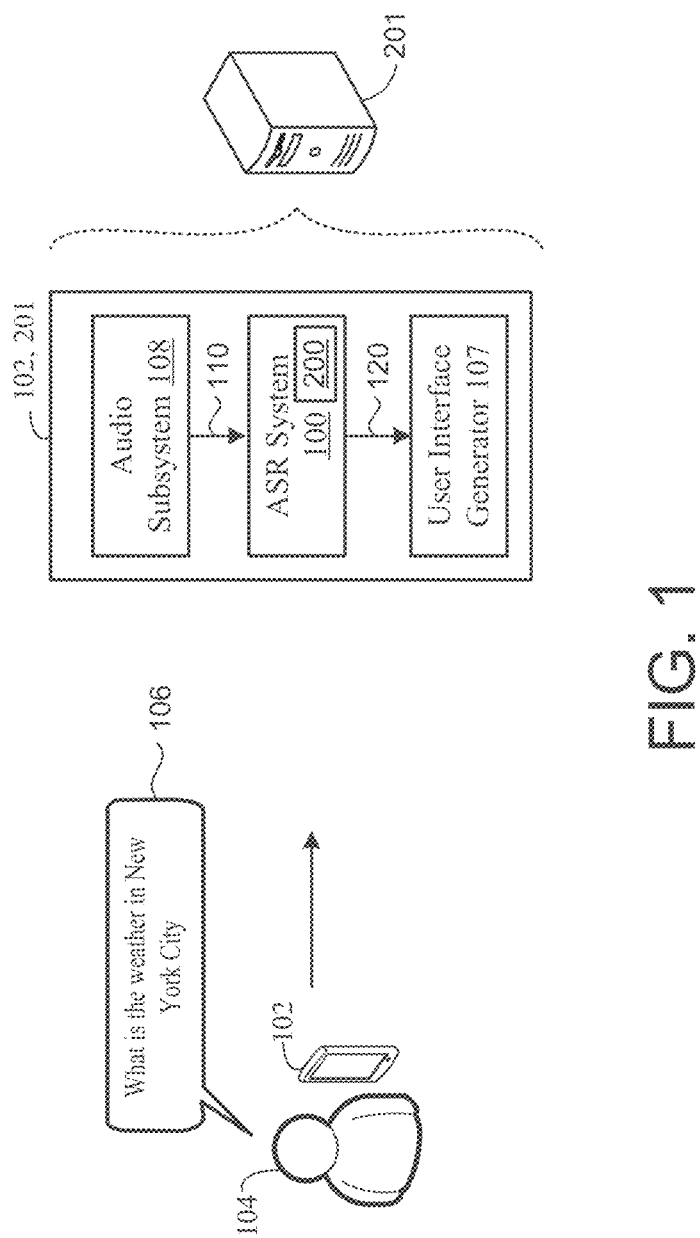
FIG. 1 is a schematic view of an example speech recognition system including a speech recognition model.

Automated speech recognition has made tremendous strides with the introduction of sequence to sequence (Seq2Seq) models that map from audio to character sequences. One challenge in developing end-to-end (E2E) deep learning-based ASR models is that parameters of the ASR models tend to over fit the training data, thereby resulting in the ASR models having difficulties generalizing unseen data when the training data is not extensive enough. Moreover, E2E ASR models tend to perform worse than traditional speech recognition systems on long and noisy speech audios. As a result, training ASR models on larger training datasets of transcribed speech data improves the accuracy of the ASR model.

Text-to-speech (TTS) or speech synthesis systems have successfully applied Seq2Seq models to obtain state of the art natural, realistic sounding synthesized speech that can be indistinguishable to the human ear from human speech. Advantageously, unspoken text utterances, or text-only data, can be easily and cheaply obtained to produce synthesizes speech for improving training of the ASR model. For instance, not only can unspoken text utterances be used to increase the volume of training data sets, but the unspoken text utterances can increase linguistic diversity in the training data without the difficulty of having to obtain transcribed speech (e.g., human spoken audio and corresponding transcriptions). While the aggregate quality of synthesized speech produced by modern TTS systems is quite high, the synthesized speech exhibits much less noise variation than non-synthesized (real/human) speech, and further exhibits minimal speech disfluencies. As a result, training ASR models exclusively on synthesized speech data have difficulty generalizing real speech utterances during inference.

Implementations herein are directed toward combining generative adversarial network (GAIN) and data augmentation techniques to increase acoustic diversity in synthesized speech produced by a TTS model for training an ASR model in parallel. As will become apparent, parameters of a GAN-based TTS model may update to produce synthetic speech representations with similar acoustics as non-synthetic speech representations recorded under adverse acoustic environments. Here, synthesized speech has the potential to drastically limit the amount of labeled human speech required to train the model, while also providing flexibility in moving the ASR model across different domains.

Additionally, data augmentation techniques may be applied to synthetic speech representations output from the GAN-based TTS model to closely match the acoustic noise disparity associated with real/human speech. Data augmentation techniques may include adding/injecting noise (e.g., via multistyle training (MTR)), adding reverberation, and/or manipulating timing (e.g., via spectrum augmentation (SpecAugment)). Implementation herein are further directed toward generating contrastive language models for selecting unspoken text utterances for use in ASR training. Namely, the use of contrastive language models can improve the efficiency of large-scale unspoken text utterance learning.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device.

The user device 102 includes an audio subsystem 108 configured to receive an utterance 106 spoken by the user 104 (e.g., the user device 102 may include one or more microphones for recording the spoken utterance 106) and overt the utterance 106 into a corresponding digital format associated with input acoustic frames 110 capable of being processed by the ASR system 100. In the example shown, the user speaks a respective utterance 106 in a natural language of English for the phrase "What is the weather in New York City?" and the audio subsystem 108 coverts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription (e.g., recognition result/hypothesis) 120 of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 104 or the remote computing device 201) may convert the transcription into synthesized speech for audible output by another device. For instance, the original utterance 106 may correspond, to a message the user 104 is sending to a friend in winch the transcription 120 is converted to synthesized speech for audible output to the friend, to listen to the message conveyed in the original utterance 106.

Figure 2A:
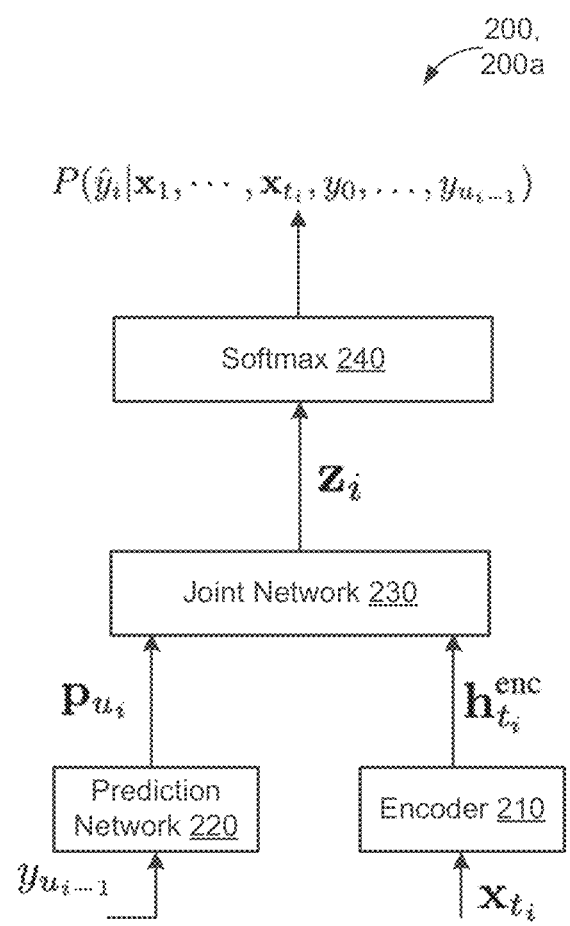
FIG. 2A is a schematic view of a Recurrent Neural Network-Transducer (RNN-T) model architecture.
Figure 2B:
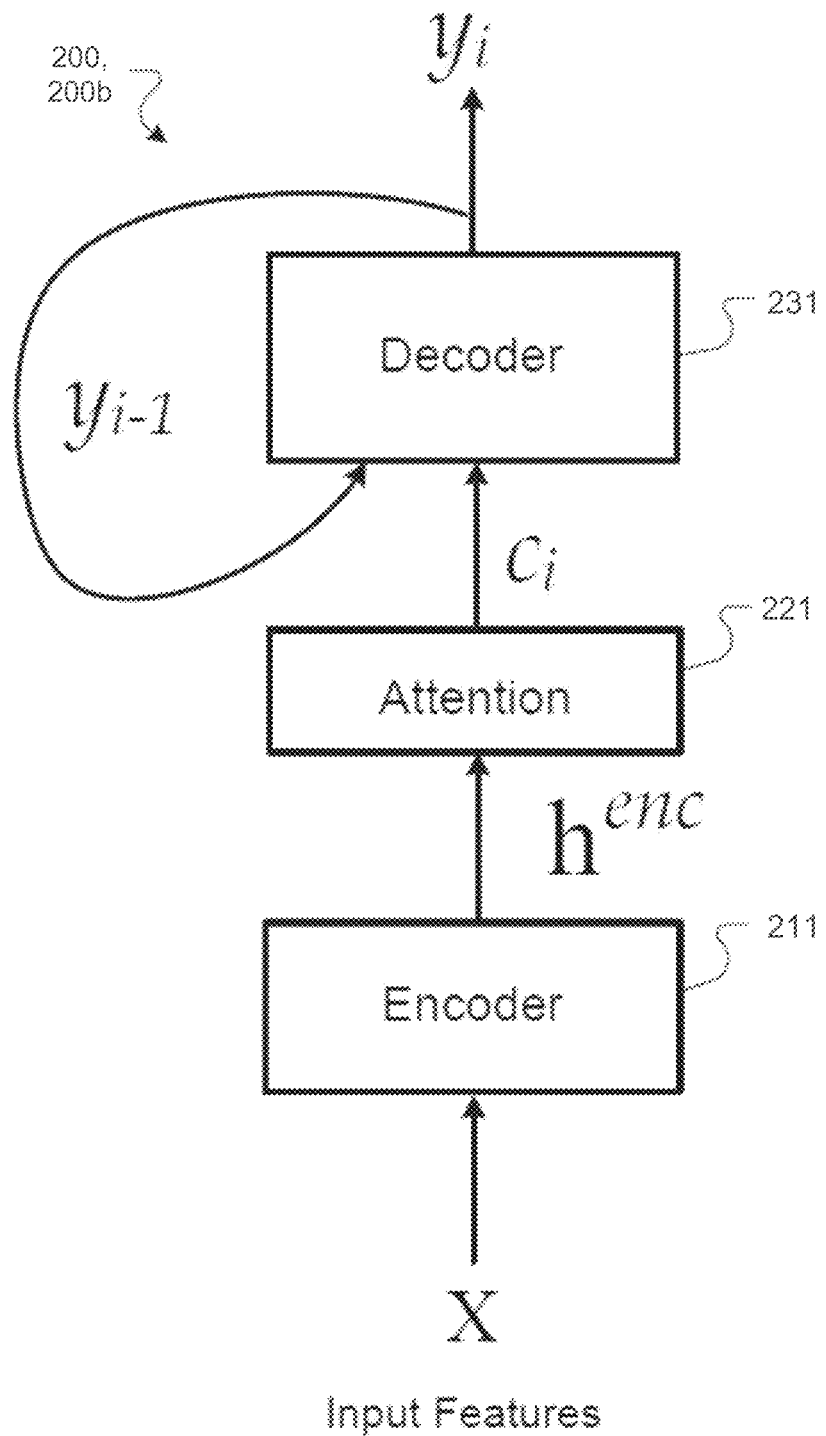
FIG. 2B is a schematic view of an Attention-Based Encoder-Decoder (ABD) model architecture.

With reference to FIGS. 2A and 2B, the ASR model 200 may include an end-to-end (E2E) sequence-to-sequence model, such as a frame alignment-based transducer model 200a (FIG. 2A) or an attention-based encoder-decoder (AED) model 200b (FIG. 2B). The ASR model 200 may provide E2E speech recognition by integrating acoustic, pronunciation, and language models into a single neural network, and does not require a lexicon or a separate text normalization component. Various structures and optimization mechanisms can provide increased accuracy and reduced model training time.

Referring to FIG. 2A, an example frame alignment-based transducer model 200a includes a Recurrent Neural Network-Transducer (RNN-T) model architecture which adheres to latency constraints associated with interactive applications. The RNN-T model 200a provides a small computational footprint and utilizes less memory requirements than conventional ASR architectures, making the RNN-T model architecture suitable for performing speech recognition entirely on the user device 102 (e.g., no communication with a remote server is required). The RNN-T model 200a includes an encoder network 210, a prediction network 220, and a joint network 230, The encoder network 210, which is roughly analogous to an acoustic model (AM) in a traditional ASR system, includes a recurrent network of stacked Long Short-Term Memory (LSTM) layers. For instance the encoder reads a sequence of d-dimensional feature vectors (e.g., acoustic frames 110 (FIG. 1)) $x = (x_1, x_2, \ldots, x_T)$, where $x_t \in \mathbb{R}^d$, and produces at each time step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction networks 210, 220 are combined by the joint network 230, The joint network then predicts $P(y_i|x_1, \ldots, x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by tire model 200a at the corresponding output step. In this manner, the RNN-T model 200a does not make a conditional independence assumption, rather the prediction of each symbol is conditioned not only on the acoustics but also on the sequence of labels output so far. The RNN-T model 200a does assume an output symbol is independent of future acoustic frames 110, which allows the RNN-T model to be employed in a streaming fashion.

Figure 3A:
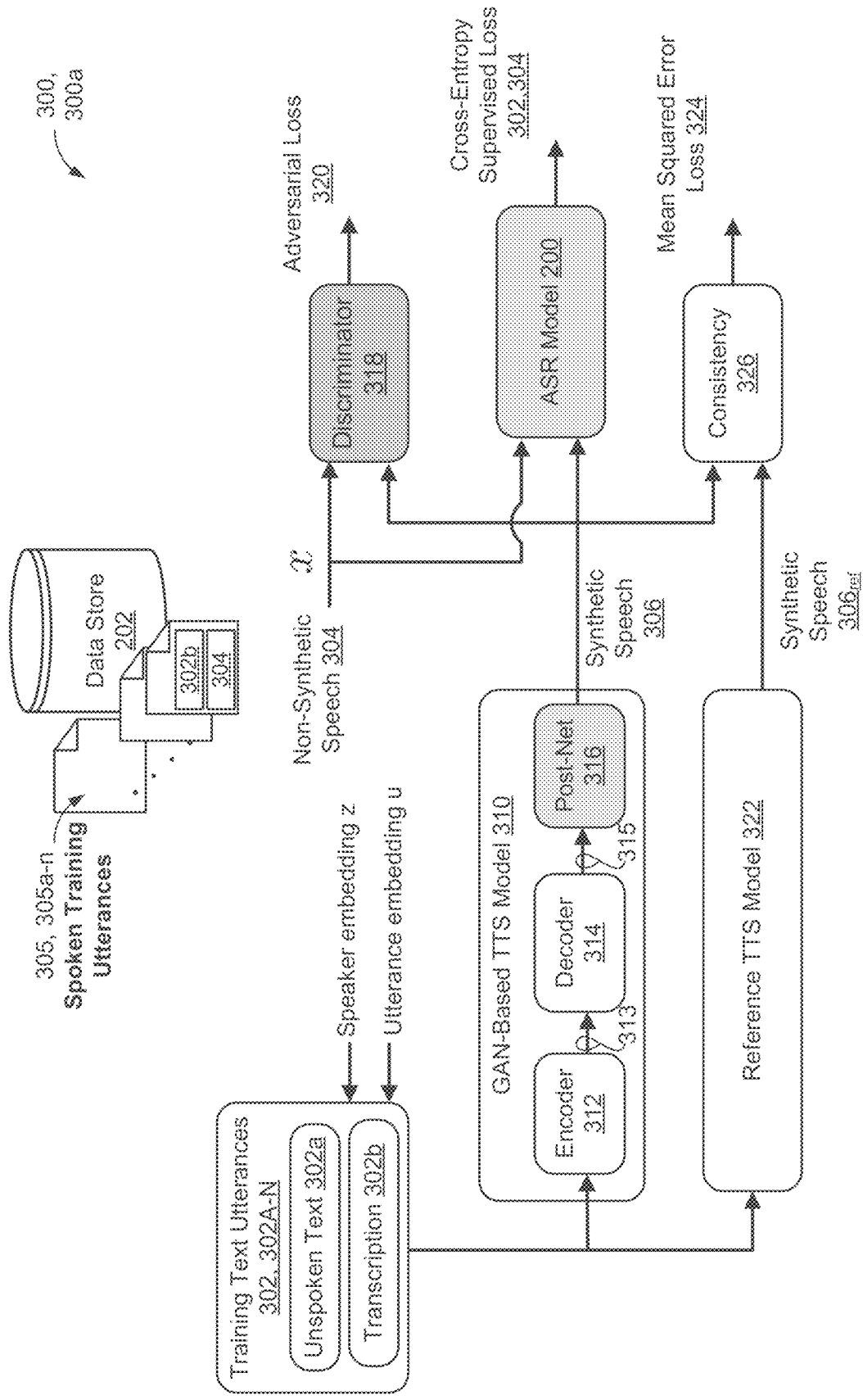
FIG. 3A is a schematic view of an example training process for training a generative adversarial network (GAN)-based text-to-speech (TTS) model and a speech recognition model in parallel.

In some examples, the encoder network 210 of the RNN-T model 200a is made up of eight 2,048-dimensional LSTM layers, each followed by a 640-dimensional projection layer. The prediction network 220 may have two 2,048-dimensional LSTM layers, each of winch is also followed by 640-dimensional projection layer. Finally, the joint network 230 may also have 640 hidden units. The softmax layer 240 may be composed of a unified word piece or grapheme set that Is generated using all unique word pieces or graphemes in a plurality of training text utterances 302 (FIG. 3A).

Referring to FIG. 2B, an example AED model 200b associated with a Listen, Attend and Spell (LAS) model architecture that provides a single neural network including a listener encoding module 211 which is analogous to a conventional acoustic model, an attender model 221 that acts as an alignment model, and a decoder 231 that is analogous to the language model in a conventional system. Specifically, the listener encoder module 211 takes the input features (e.g., acoustic frames 110 (FIG. 1)), x, and maps them to a higher-level feature representation, $h^{enc}$. This process of generating an encoded feature representation, $h^{enc}$, can be done for each of multiple input frames, representing different input time steps. These timesteps are denoted with subscript u below. Thus, for a set of frames $\{f_1, f_2, f_3, \ldots f_u\}$ there can be a corresponding set of encoded outputs $(h_1, h_2, h_3, \ldots h_u)$.

The output of the encoder 211 is passed to the attender model 221, which determines which encoder features in $h^{enc}$ should be attended to in order to predict the next output symbol, $y_i$, similar to a dynamic time warping (DTW) alignment module. In some examples, attender 221 is referred to herein as attender neural network or attention module 221. The attender 221 can generate a context output $c_i$ for each of multiple output steps i. For each context output vector $c_i$, the attender 221 can compute attention based on the encodings for one or more input steps u, e.g., the encoding for the current input step as well as encodings for previous input steps. For example, the attender 221 can generate an attention context output $c_i$ over the set of all the encoder outputs of the utterance, e.g., the entire set $\{h_1, h_2, h_3, \ldots h_u\}$. The attention context a vector can be vector representing a weighted summary of the current and previous encodings for frames (e.g., portions) of the utterance being recognized.

Finally, the output of the attender 221 is passed to the decoder 231, which takes the attention context (e.g., a context vector or attention distribution), $c_i$, output by the attender 221, as well as an embedding of the previous prediction, $y_i-1$, in order to produce a decoder output. The decoder output can be a probability distribution, $P(y_i|y_{i-1}, \ldots, y_0, x)$, over the current sub-word unit, $y_i$, given the previous units, $\{y_{i-1}, \ldots, y_0\}$, and input, x. Accordingly, the decoder 231 generates, at each output step, a probability distribution over possible speech recognition hypotheses. As with the RNN-T model 200a discussed above with reference to FIG. 2A, the "possible speech recognition hypotheses" correspond to a set of output symbols each representing a symbol/character in a specified natural language.

Although not illustrated, the model 200 may Include a softmax layer that receives output of the decoder 231. In some implementations, the softmax layer is separate from the decoder 231 and processes the output, $y_i$, from the decoder 231, and the output of the softmax layer is then used in a beam search process to select orthographic elements. In some implementations, the softmax layer is integrated with the decoder 231, so that the output $y_i$ of the decoder 231 represents the output of the softmax layer.

The decoder 231 and/or an associated softmax layer may be trained to output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the decoder 231 and/or the softmax layer can include a posterior probability value for each of the different output labels. Thus, if there are 100 different output labels representing different graphemes or other symbols, the output $y_i$ of the decoder or the output of a softmax layer that receives and processes the output $y_i$ can include 100 different probability values, one for each output label. The probability distribution can then be used to select and assign scores to candidate orthographic elements (e.g., graphemes, wordpieces, and/or words) in a beam search process for determining the transcription 120.

Figure 3B:
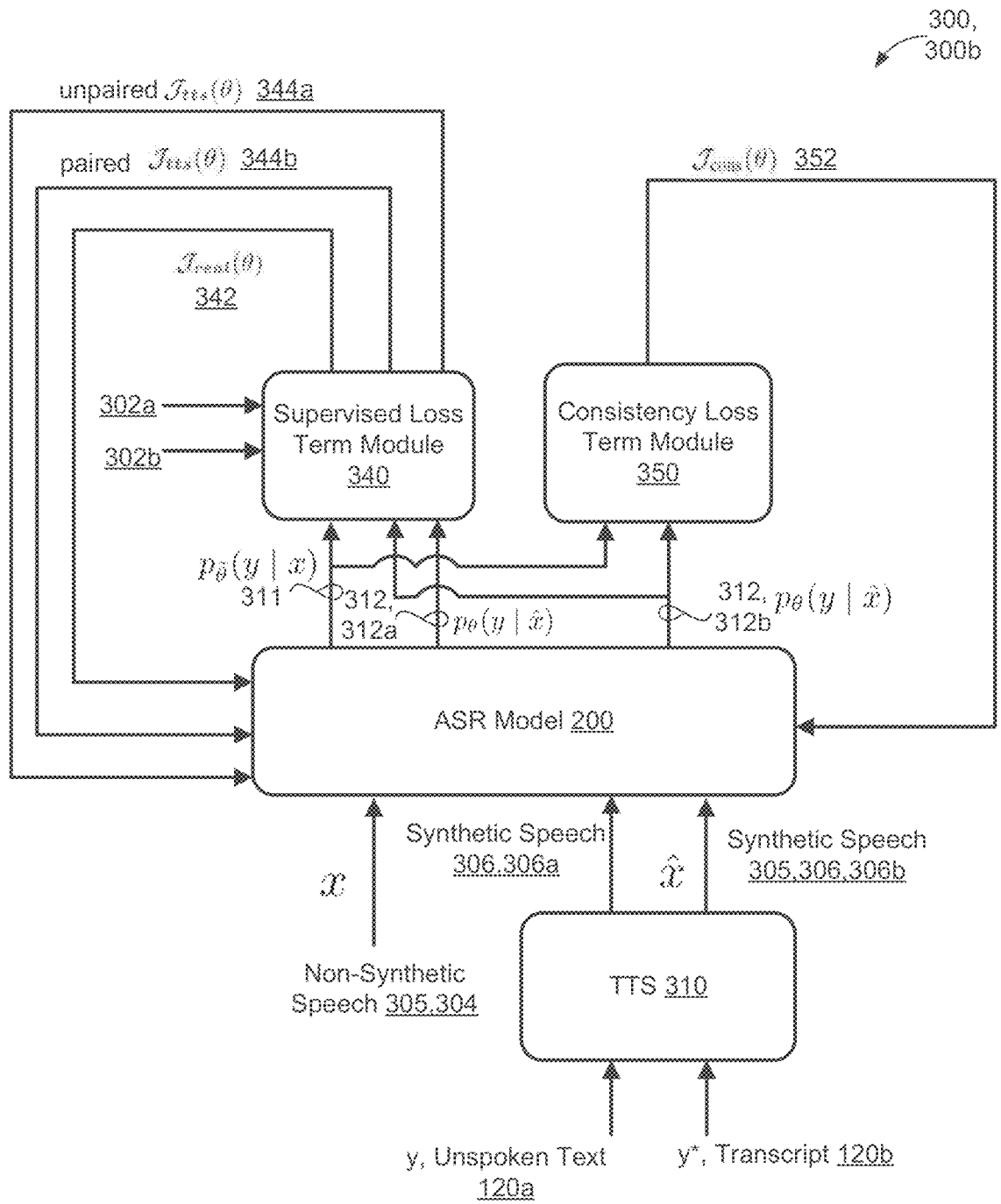
FIG. 3B is a schematic view of an example training process for promoting the speech recognition model of FIG. 1 to learn consistent predictions on both non-synthetic speech and synthetic speech.
Figure 3C:
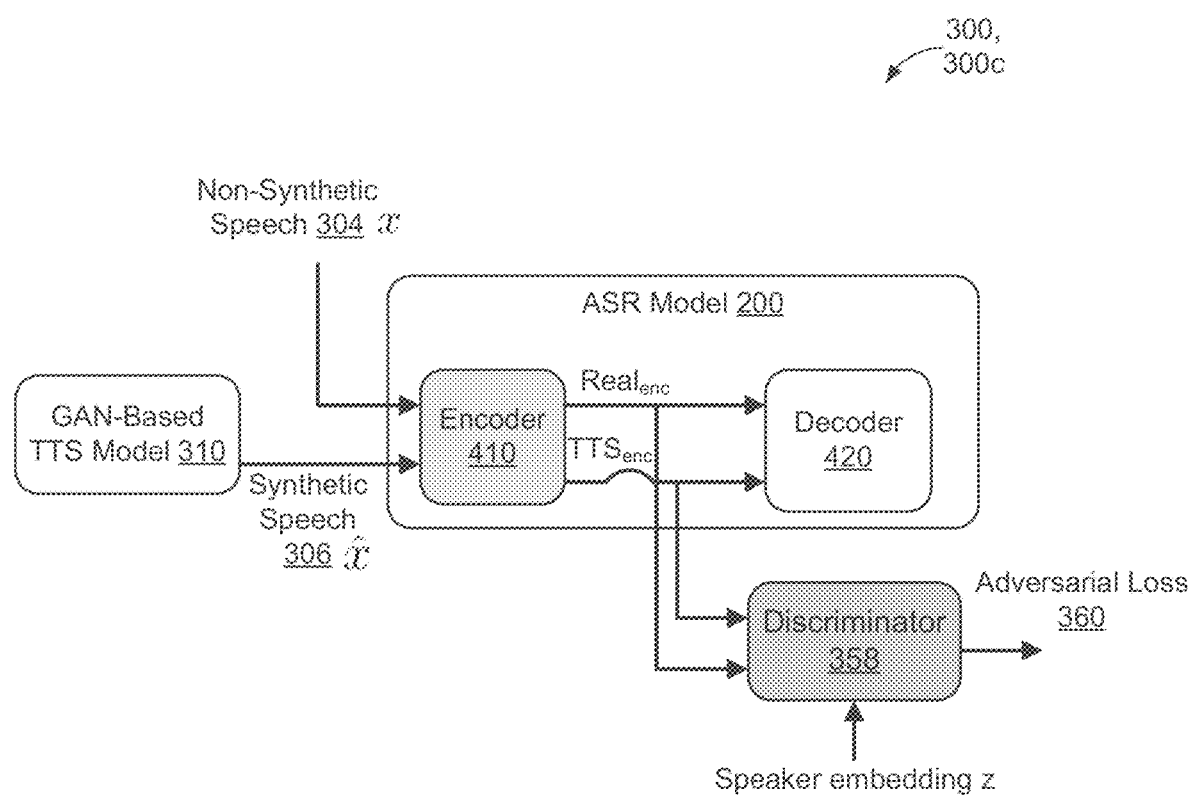
FIG. 3C is a schematic view of an example training process for promoting domain-invariant learning by the speech recognition model of FIG. 1.

FIGS. 3A-3C show an example training process 300, 300a-300c for training a generative adversarial network (GAN)-based text-to-speech (TTS) model 310 and a speech recognition model 200 in unison. The training process 300 may execute on the remote computing device 201 of FIG. 1. The speech recognition model 200 may be referred to as an ASR model 200. The training of the GAN-based TTS model 310 promotes learning by the model 310 to produce synthetic speech representations 306 with similar acoustics as non-synthetic speech representations 304 recorded under adverse acoustic environments. Here, synthesized speech has the potential to drastically limit the amount of labeled human speech required to train the ASR model 200, while also providing flexibility in moving the ASR model 200 across different domain. Additionally, the training process 300 promotes the ASR model 200 to learn consistent predictions on each of non-synthetic speech (e.g., real/human speech), synthetic speech produced from transcribed speech, and synthetic speech produced form unspoken text utterances not paired with any corresponding audio/speech.

Referring to FIG. 3A, the example training process 300a initially obtains a plurality of training text utterances 302, 302A-N that the GAN-based TTS model 310 converts into synthetic speech representations 306 for training the ASR model 200, A first portion of the plurality of training text utterances 302 include unspoken text utterances 302a and a second remaining portion of the plurality of training text utterances 302 include transcriptions 302b in a set of spoken training utterances 305, 305a-n. Here, each unspoken text utterance 302a is text-only data, i.e., unpaired data, such that the unspoken text utterance 302 is not paired with any corresponding spoken utterance or audible speech. On the other hand, each spoken training utterance 305 in the set of spoken training utterances 305 includes a corresponding transcription 302b paired with a corresponding non-synthetic speech representation 304 of the corresponding spoken training utterance 305, For instance, each non-synthetic speech representation 304 may be hand-transcribed by a human listener. Accordingly, each transcription 302b may correspond to transcribed speech of a corresponding non-synthetic speech representation 304 such that the each spoken training utterance 305 includes respective "paired data" 302b, 304.

The set of spoken training utterances 305 may be stored in a data store XX residing on memory hardware of a system (e.g., remote computing device 201 of FIG. 1). In some examples, each spoken training utterance 305 in the set of spoken teaming utterances 305 is associated with a specific domain for training the ASR model 200. For instance, the ASR model 200 may be trained to recognize speech in domains such as music, navigation, weather, occupational fields, education disciplines, as well as language-specific and/or multilingual domains.

Each training text utterance 302 input the GAN-based TTS model 310 may be conditioned on a speaker embedding, z, and an utterance embedding, u, its conversion into synthesized speech 306 having a specific speaking style associated with the speaker embedding, z, and an intended prosody associated with the utterance embedding, u. The utterance embedding u may be selected from a set of utterance embeddings each representing an intended prosody. For instance, each utterance embedding u may encode prosodic features of syllable duration, pitch contour, and our energy contour. In some examples, when the corresponding training text utterance 302 includes the transcription 302b in a spoken training utterance 305, tire utterance embedding u is extracted as a latent feature from the corresponding non-synthetic speech representation 304 using a variational autoencoder (VAE). The VAE may incorporate a hierarchical structure. In additional examples, when the corresponding training text utterance 302 includes the unspoken text utterance 302a, the unspoken text utterance 302a is conditioned on a randomly assigned utterance embedding u that was previously extracted from one of the non-synthetic speech representations 304 in the set of spoken training utterances using the VAE.

Each speaker embedding, z, may include a D-vector that was pre-extracted from the set of spoken training utterances 305 using a separately trained speaker encoder (not shown). Here, the D-vector may be extracted from the non-synthetic speech representation 304 of the spoken training utterance 305 using a speaker encoder neural network such that the D-vector encodes speaker characteristics of the speaker that spoke the spoken training utterance 305 into a fixed-length vector. Accordingly, each speaker embedding z may be selected from a set of speaker embeddings z that were previously extracted and stored (e.g., in the data store 202), Each speaker embedding z in the set of speaker embeddings represents speaker characteristics of a speaker that spoke the corresponding spoken training utterance 305, The pre-extracted speaker embeddings z may be randomly assigned to each training text utterance 302. In some examples, when the corresponding training text utterance 302 includes the transcription 302b in a spoken training utterance 305, the transcription 302b is conditioned on the speaker embedding z pre-extracted from the corresponding non-synthetic speech representation 304.

In some implementations, the TTS model 310 includes an encoder 312, a decoder 314, and a post-net 316 that cooperate to process the training text utterances 302 to generate time-domain audio waveforms. A time-domain audio waveform is an audio waveform that defines an audio signal's amplitude over time.

The encoder 312 may be an encoder neural network 312 configured to receive the training text utterance 302 as a sequence of characters and generate a fixed-length context vector 313 for each m el-frequency spectrogram 315 that the decoder 314 will later generate. In some examples, the characters of the training text utterances 302 include phonemes based on a pronunciation model. For instance, each training text utterance 302 may be represented as a sequence of phonemic inputs based on an American English pronunciation model Here, the fixed-length context vectors 313 (e.g., phonemic encodings) define features that appear m particular positions in the sequence of characters (e.g., sequence of phonemes). The features model the context in which each character in the sequence of characters appears in each training text utterance 302.

In some configurations, the encoder neural network 312 includes one or more convolutional layer's followed by a bi-directional long short-term memory ("LSTM") layer. Each convolutional layer can be followed by batch normalization and rectified linear units ("ReLUs"), and the bi-directional LSTM layer can be configured to process the hidden features generated by the final convolutional layer to generate a sequential feature representation of the sequence of characters. A sequential feature representation represents a local structure of the sequence of characters around a particular character. A sequential feature representation may include a sequence of feature vectors.

The encoder neural network 312 can also include an attention network. The attention network can be configured to receive a sequential feature representation from another component of the encoder neural network 312, e.g., a bi-directional LSTM layer, and process the sequential feature representation to generate the fixed-length context vector 313 for each output step of the decoder 314. That is, the attention network can generate a fixed-length context vector 313 for each frame of a mel-frequency spectrogram 315 that the decoder 314 will later generate, A frame is a unit of the mel-frequency spectrogram that is based on a small portion of the input signal, e.g., a 10 millisecond sample of the input signal.

In some implementations, the decoder 314 includes a decoder neural network 314 configured to receive, as input, the fixed-length context vectors 313 generated by the encoder neural network 312 and generate, as output for each fixed-length context vector 313, a corresponding frame of a mel-frequency spectrogram 315. A mel-frequency spectrogram is a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity. In some implementations, the mel-frequency spectrograms 315 that the decoder neural network 314 generates have a frame length of 12.5 milliseconds.

The post-net 316 may be a component of the decoder neural network 314 and may be configured to refine acoustic characteristics of the mel-frequency spectrograms 315 generated by the decoder neural network 314. In some examples, the post-net 316 is a convolutional post-net 316 with one or more convolutional layers that processes the predicted mel-frequency spectrogram 315 for each output step to predict a residual to add to the predicted mel-frequency spectrogram 315. Each convolutional layer except for the final convolutional layer may be followed by batch normalization and tan h activations. The convolutional layers may be regularized using dropout with probability 0.5. The residual is added to the predicted mel-frequency spectrogram 315 to produce the resulting synthetic speech representation 306 of each corresponding training text utterance 302.

In the example shown in FIG. 3A, the GAN-based TTS model 310 used for training the ASR model 200 is pre-trained so that it is capable of converting the input training text utterances 302 into corresponding synthetic speech representations 306. However, implementations herein are directed toward the training process 300a fine-tuning parameters of the post-net 316 to "noisily" the resulting synthetic speech representations 306 to match acoustic noise disparity found in non-synthetic speech representations 304 spoken by real humans in adverse acoustic environments. Accordingly, the pre-trained GAN-based TTS model 310 executes as a quasi-inference stage during the training process 300a to generate/predict the corresponding synthetic speech representations 306, while the training process 300a aims to fine-time the post-net 316 parameters for producing synthetic speech representations 306 with acoustics that match those of non-synthetic speech representations 304. The shading of the post-net 316 at the GAN-based TTS model 310, an adverse discriminator 318 of the GAN, and the ASR model 200 depicted in FIG. 1 indicate that these are the only components trained by the training process 300a.

At each of a plurality of output steps for each training text utterance 302 of the plurality of training text utterances 302, the training process 300a generates, for output by the GAN-based TTS model 310, a synthetic speech representation 306 of the corresponding training text utterance 302, and determines, using the adversarial discriminator 318, an adversarial loss term 320 indicative of an amount of acoustic noise disparity in a non-synthetic speech representation 304 relative to the corresponding synthetic speech representation 306 of the corresponding training text utterance 302. Here, the adversarial discriminator 318 compares acoustic noise characteristics of the non-synthetic speech representation 304 relative to the synthetic speech representation 306 output by the GAN-based TTS model 310 at the output step. To put another way, the adversarial discriminator 318 is tasked to analyze the synthetic speech representation 306 in terms of general realism by distinguishing between the non-synthetic speech representation 304 (e.g., real/human audible speech) and the synthetic speech representation 306. The training process 300a is configured to update parameters of the GAN-based TTS model 310 based on the adversarial loss term 320 determined at each of the plurality of output steps for each training text utterance 302 of the plurality of training text utterances. Specifically, the training process 300a updates parameters of the post-net 316 by back-propagating the adversarial loss terra(s) 320 through the post net 316 to teach the post-net 316 to drive the resulting synthetic speech representations 306 to have similar acoustics as the non-synthetic speech representations 304 in the set of spoken training utterances 305.

The non-synthetic speech representation 304 input to the adversarial discriminator 318 for comparison with the synthetic speech representation 306 at each output step may be selected from the set of spoken training utterances 305, For example, when the synthetic speech representation 306 input to the adversarial discriminator 318 is generated from a training text utterance 302 that includes one of the unspoken text utterances 302a, the non-synthetic speech representation 304 is randomly selected from the set of spoken training utterances 305 for comparison at the adversarial discriminator 318 since the unspoken text utterance 302a not initially paired with any corresponding spoken audio. On the other hand, when the synthetic speech representation 306 input to the adversarial discriminator 318 is generated from a training text utterance 302 that includes one of the transcriptions 302b of the spoken training utterances 305, the training process 300a may select the non-synthetic speech representation 304 from the set of spoken training utterances 305 that is paired with the corresponding transcription 302b for comparison at the adversarial discriminator 318.

In some examples, the training process 300a additionally applies data augmentation to the synthetic speech representations 306 generated by the GAN-based TTS model 310 prior to determining the adversarial loss term 320 at each of the plurality of output steps. The purpose of the data augmentation is to further facilitate the generation of synthetic speech with audio that matches the non-synthetic speech under adverse acoustic environments, thereby regularizing the training of the ASR model 200 on synthetic speech representations 306 by preventing over-fitting due acoustic mismatches between non-synthesized and synthetic speech representations 304, 306. In some examples, the post-net 316 at the TTS model 310 injects background noises to the synthetic speech representations to match acoustics of the non-synthetic speech representations 304 of the spoken training utterances 305. In other words, data augmentation allows the TTS model 310 to generate a synthetic speech representation 306 that has an expectation of being consistent with a non-synthetic speech representation 304, The data augmentation may include at least one of adding/injecting noise, adding reverberation, or manipulating timing of the synthetic speech representations 306, One data augmentation technique includes using multistyle training (MTR) to inject varieties of environmental noises to the synthetic speech representations 304. Another data augmentation technique that the training process 300a may apply in addition to, or in lieu of MTR, includes using spectrum augmentation (SpecAugment) to make the acoustics of the synthetic speech representations 306 closer to the adverse acoustics of non-synthetic speech representations 304 of the spoken training utterances 305. In combination. Mill and SpecAugment may inject noises into the synthetic speech representations 304, tile random external noise sources along time and inserted before and overlapped onto the representation 304, and filtering the noise-injected synthetic speech representation 304 prior to training the ASR model 200.

In additional implementations, at each of the plurality of output steps for each training text utterance 302, the training process 300a generates, for output by a reference TTS model 322, a reference synthetic speech representation $306_{ref}$ of the corresponding training text utterance 302, and determines a consistency loss term 324 based on the synthetic speech representation 306 of the corresponding training text utterance 302 output by the GAN-based TTS model 310 and the reference synthetic speech representation $306_{ref}$ of the same corresponding training text utterance 302 output by the reference TTS model 322. For example, FIG. 3A shows a consistency module 326 receiving the synthetic speech representation 306 output by the GAN-based TTS model 310 and the reference synthetic speech representation $306_{ref}$ output by the reference TTS model 322 for the same training text utterance 302 at a given time step, and producing a mean squared error (MSE) loss 324 between the two speech representations 306, $306_{ref}$. As with the adversarial loss term 320, the training process 300a is configured to update the parameters of the GAN-based TTS model 310 based on the consistency loss term 324 determined at each of the plurality of output steps for each training text utterance 302 of the plurality of training text utterances. Specifically, the training process 300a updates parameters of the post-net 316 by back-propagating both the adversarial loss term 320 and the consistency loss term (e.g., MSE loss) 324 through the post net 316 to teach the post-net 316 to drive the resulting synthetic speech representations 306 to have similar acoustics as the non-synthetic speech representations 304 in the set of spoken training utterances 305.

By back-propagating the consistency loss term 324 through the post-net 316 of the GAN-based TTS model 310, the training process 300a is constrained to produce synthetic speech representations 306 output by the GAN-based TTS model 310 that retain their linguistic information. Otherwise, updating the parameters of the post-net 316 to promote acoustic diversity based on the adversarial loss 320 alone may result in loss of linguistic diversity across the synthetic speech representations 306. The use of the unspoken text utterances 302a is to promote increases in linguistic diversity to enable training of the ASR model 200 on unseen words and sequences not present in the spoken training utterances 305. Notably, parameters of the reference TTS model 3220 remain fixed so that the reference TTS model 320 is able to consistently generate synthetic speech representations 306 that retain linguistic diversity. The reference TTS model 322 may include an identical architecture as the GAN-based TTS model 310. For instance, when the training process 300a initializes, the TTS models 310 may be replicas trained on the same training data sets.

Figure 4:
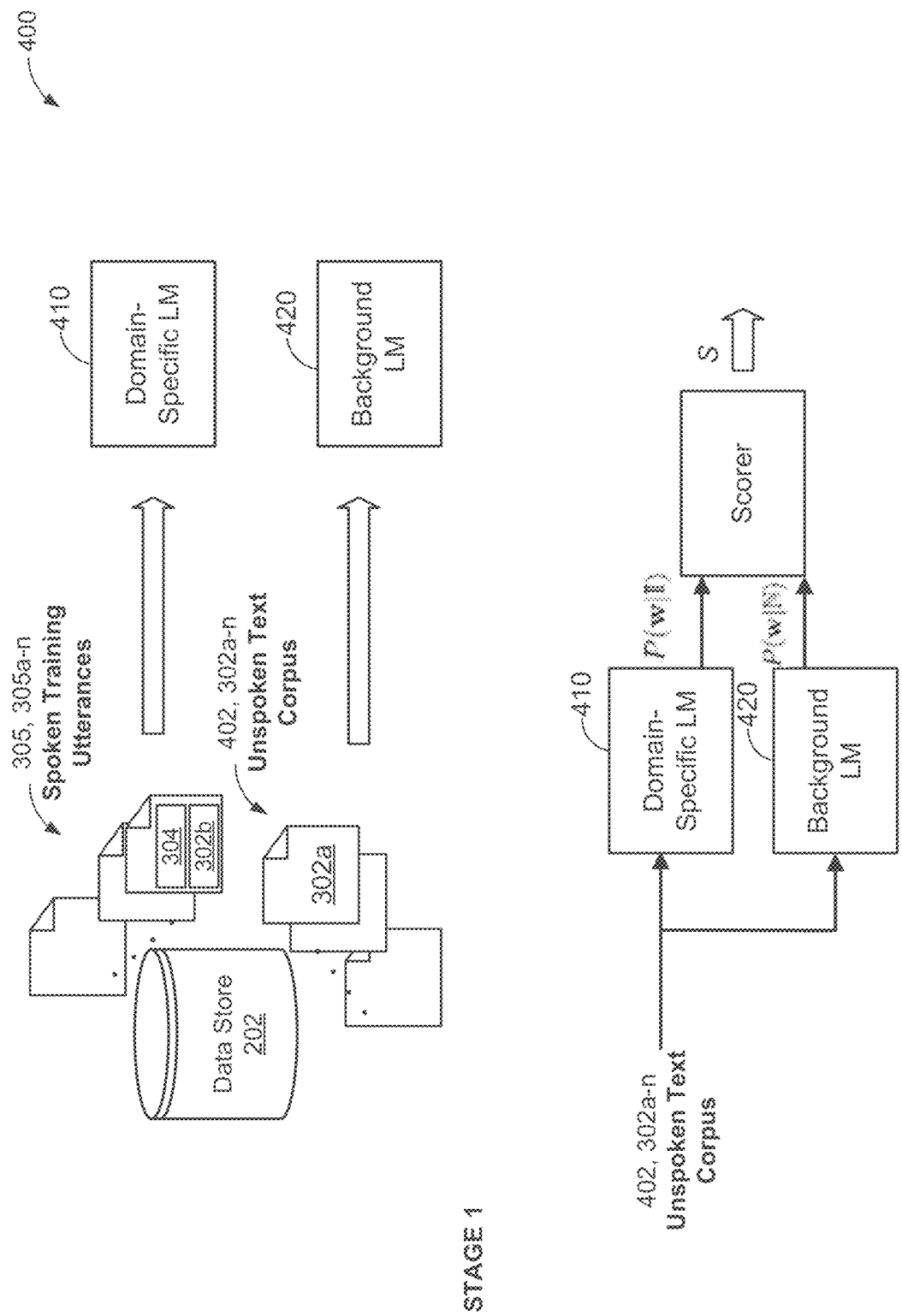
FIG. 4 is a schematic view of an example selection process tor selecting unspoken text utterances for training fee GAN-based TTS model and the speech recognition model of FIG. 1.

In some examples, the first portion of the plurality of training text utterances 302 that includes the unspoken text utterances 302a used to train the GAN-based TTS model 310 and the ASR model 200 in unison are selected in a manner that optimizes the training process 300 of FIGS. 3A-3C. That is, while unspoken text utterances can be obtained easily and cheaply, some unspoken text utterances 302a are more suitable for ASR model 200 training than others. In some examples, the unspoken text utterances 302a are selected as being associated with a domain in which the ASR model 200 is being trained. In this example, if the ASR model 200 is trained for recognizing speech in the music domain, unspoken text utterances 302a used in a medical terminology would not be suitable for use in training the ASR model 200. FIG. 4 provides an example unspoken text selection process 400 for obtaining the unspoken text utterances 302a in the first portion of the plurality of training text utterances 302. Specifically, the unspoken text selection process 400 is configured to select the unspoken text utterances 302a from a corpus of unspoken text 402. The corpus of unspoken text 402 includes a multitude of unspoken text utterances 302 from across a large range of domains, and includes a far greater linguistic diversity than the transcriptions 302b in the set of spoken training utterances 305. As mentioned previously, the set of spoken training utterances 305 may be domain-specific in that they pertain to the same domain in which the ASR model 200 is being trained. The corpus of unspoken text 402 may be stored in the same or different data store 202 as the spoken training utterances 305. The corpus of unspoken text 402 may dynamically change to incorporate new unspoken text utterances 302a. Simply using all unspoken text utterances 302a in the unspoken text corpus 402 (FIG. 4) is not feasible for the following reasons: i) for each sentence, the speech modality needs much more memory to be encoded than text, thereby making converting all text in the corpus 402 impractical; ii) conversion between speech and text modalities in TTS inference and ASR training also requires large computation: iii) the vast amount of difference between the transcriptions 302b In the spoken training utterances 305 and the unspoken text utterances 302a in the unspoken text corpus 402 requires intelligent strategies to balance their contributions.

The unspoken text selection process 400 aims to select a subset of the available unspoken text utterances 302a from the unspoken text corpus 402 as the data for TTS synthesis. Specifically, the process 400 aims to improve the match between the selected subset of the available unspoken text utterances 302a and a target domain, which in turn reduces the computational resources required to exploit a large amount of now domain-specific data. Accordingly, the process 400 reduces computational and memory costs by selecting unspoken text utterances 302a that best match a specific domain the ASR model 200 is being trained to learn.

During a first stage (STAGE 1), the unspoken text selection process 400 braids two language models 410, 420 to enable contrastive selection of the unspoken text utterances 302a. Here, a domain-specific language model (LM) 410 is trained on each transcription 302b in the set of spoken training utterances 305. The set of spoken training utterances 305 are assumed to belong to a specific-domain for which the ASR model 200 is being trained. On the other hand, a background LM 420 is trained on each unspoken text utterance 302a in the entire unspoken text corpus 402. As mentioned previously, the unspoken text corpus 402 spans a multitude of different domains. In some examples, the first stage uses n-gram language model training to build the two language models 410, 420. In other examples, the first stage uses neural network language model training to build the two language models 410, 420.

During a second state (STAGE 2), the unspoken text selection process 400 uses the two contrastive LMs 410, 420 to evaluate each unspoken text utterance 302a in the unspoken text corpus 402 by determining a first probability, $P(w|\mathbb{I})$, associated with each word in the unspoken text utterance 302a appearing in the domain-specific LM 410 and determining a second probability, $P(w|\mathbb{N})$, associated with each word in the unspoken text utterance 302a appearing in in the background LM 420. Thereafter, for each unspoken text utterance 302a in the unspoken text corpus 402, the process 400 determines, at a scorer 430, a score, S, based on the first probability, the second probability, and a number of words, #(w), appearing in the corresponding unspoken text utterance 302a. For example, the score S for each unspoken text utterance 302a may be calculated as follows:

$$S = \frac{\log P(w|\mathbb{I}) - \log P(w|\mathbb{N})}{\#(w)} \quad (1)$$

After determining the scores, the unspoken text selection process 400 selects the unspoken text utterances 302a with the N-best utterance scores S as these unspoken text utterances 302a best match the specific-domain. In lieu of using the unspoken text selection process 400, the unspoken text utterances 302a may alternatively sampled from a well-trained language model, such as a large max-entropy language model using the available text corpus 402. Under the assumption that this model learns the distribution of data, a certain number of text utterances 302a may be sampled therefrom for unspoken text Referring to FIG. 3B, the training process 300b trams the ASR model 200 on the synthetic speech representations 306 generated at each of the plurality of output steps for each unspoken training text utterance 302 of the plurality of unspoken text utterances 302 (e.g., that were selected by the unspoken text selection process 400 of FIG. 4). The training process 300b also trains the ASR model 200 at each of a plurality of output steps for each non-synthetic speech representation 304 in the set of spoken training utterances 305. The synthetic speech representations 306 include unpaired synthetic speech representations 306a and paired synthetic speech representations 306b. The unpaired synthetic speech representations 306a include the TTS audios converted by the GAN-based TTS model 310 from the unspoken text utterances 302a (i.e., the portion of the training text utterances 302 not paired with any corresponding spoken utterance), while the paired synthetic speech representations 306b include the TTS audios converted by the GAN-based TTS model 310 from the transcriptions 302b in the set of spoken training utterances 305 (i.e., the portion of the training text utterances 302 paired with corresponding non-synthetic speech representations 304 of spoken training text utterances 305).

Accordingly, each paired synthetic speech representation 306b is paired with a corresponding non-synthetic speech representation 304 of a same corresponding spoken training utterance 305, and the transcription 302b initially paired with the non-synthetic speech representation 304 of the corresponding training utterance 305 serves as both: (1) an input to the GAN-based TTS model 310 for generating the paired synthetic speech representation 306b of the corresponding training utterance 305; and (2) a ground-truth transcription 302b for the training process 300b in generating supervised loss terms 342, 344b between the ground-truth transcription 302b and each of: a non-synthetic speech recognition hypothesis 311 output by the ASR model 200: and a paired synthetic speech recognition hypothesis 312b output by the ASR model 200. On the other hand, the training process 300b uses each unspoken text utterance 302a that was converted into a corresponding unpaired synthetic speech representation 306a by the GAN-based TTS model 310 for generating a supervised loss term 344b between the corresponding unspoken text utterance 302a and an unpaired synthetic speech recognition hypothesis 312a output by the ASR model 200.

The ASR model 200 receives, as input, the non-synthetic speech representation (x) 304 for each corresponding spoken training utterance 305 as a sequence of features/vectors (e.g., mel-frequency spectrogram frames) (e.g., acoustic frames 110 of FIG. 1) and generates, as output, for each of a plurality output steps, a first probability distribution 311 over possible non-synthetic speech recognition hypotheses (y) for the corresponding non-synthetic speech representation (x) 304 of the corresponding spoken training utterance 305. For simplicity, the term "non-synthetic speech recognition result 311" may be used to refer to the first probability distribution 311 over possible non-synthetic speech recognition hypotheses (y) for the corresponding non-synthetic speech representation (x) 304. The ASR model 200 also receives, as input the synthetic speech representation ($\hat{x}$) 306, 306a-b for each training text utterance 302, 102a b as a sequence of features/vectors (e.g., mel-frequency spectrogram frames) (e.g., acoustic frames 110 of FIG. 1) and generates, as output, for each of a plurality of output steps, a second probability distribution 312, 312a-b over possible synthetic speech recognition hypotheses (y) for the corresponding synthetic speech representation ($\hat{x}$) 306 of the corresponding utterance. For simplicity, the term "synthetic speech recognition result 312" may be used to interchangeably refer to the second probability distribution 312 over possible synthetic speech recognition hypotheses (y) its the corresponding synthetic speech representation ($\hat{x}$) 306. Lastly, the ASR model 200 also receives, as input, the synthetic speech representation ($\hat{x}$) 306a for each unspoken text utterance 302a as a sequence of features/vectors (e.g., mel-frequency spectrogram frames) (e.g., acoustic frames 110 of FIG. 1) and generates, as output, for each of a plurality of output steps, a third probability distribution 312a over possible synthetic speech recognition hypotheses (y) for the corresponding synthetic speeds representation ($\hat{x}$) 306 of the corresponding utterance. For simplicity, the term "synthetic speech recognition result 312b" may be used to interchangeably refer to the second probability distribution 312b over possible synthetic speech recognition hypotheses (y) for the corresponding synthetic speech representation ($\hat{x}$) 306.

As with training a conventional end-to-end sequence-to-sequence ASR model, the training process 300b generates, for output by the ASR model 200 at each of the plurality of output steps, a first supervised loss term that includes a non-synthetic speech loss term ($\mathcal{J}_{real}(\theta)$) 342 based on the ground-truth transcription 302b and the non-synthetic speech recognition result 311 (y) for the corresponding non-synthetic speech representation (x) 304 of the corresponding spoken training utterance 305. In the example shown, tire training process 300b executes a supervised loss term module 340 configured to receive the ground-truth transcription 120b and the first probability distribution 311 and output the non-synthetic speech loss term ($\mathcal{J}_{real}(\theta)$) 342.

Moreover, the training process 300b generates, at each of the plurality of output steps, a second supervised loss term that includes a synthetic speech loss term ($\mathcal{J}_{tts}(\theta)$) 344, 344a-b based on the corresponding one of the unspoken text utterance 302a or the ground-truth transcription 302b and the second probability distribution 312, 312a b over possible synthetic speech recognition hypotheses (y) for the corresponding synthetic speech representation ($\hat{x}$) 306, 306a-b of the corresponding utterance, in the example shown, an unpaired synthetic speech loss term 344a is associated with each unpaired synthetic speech representation 306a and corresponding unspoken text utterance 302a, while a paired synthetic speech loss term 344b is associated with each paired synthetic speech representation 306b and corresponding ground-truth transcription 302b. In the example shown, the training process 300b executes the supervised loss term module 340 configured to receive the unspoken text utterances 120a, ground-truth transcriptions 120b, and the second probability distributions 312, 312a-b and output the synthetic speech loss terms ($\mathcal{J}_{tts}(\theta)$ 344, 344a-b.

The supervised loss term module 340 may provide each of the non-synthetic speech loss term ($\mathcal{J}_{real}(\theta)$) 342, the unpaired synthetic speech loss term ($\mathcal{J}_{tts}(\theta)$) 344a, and the paired synthetic speech loss term 344b back to the ASR model 200, For instance, the training process 300b may train the ASR model 200 using a stochastic optimization algorithm, such as stochastic gradient decent, to train the model 200 through backpropagation. Here, the stochastic optimization algorithm uses the loss terms 342, 344a, 344b to define respective loss functions (e.g., cross-entropy loss functions) based on a difference between actual outputs (e.g., non-synthetic speech recognition and synthetic speech recognition results 311, 312a, 312b) of the neural network and desired outputs (e.g., the unspoken text utterances 302a and ground-truth transcriptions 302b), For instance, the loss function is computed for a batch of training examples, and then differentiated with respect to each weight in the model 200. In batch training, the non-synthetic speech loss term ($\mathcal{J}_{real}(\theta)$) 342 may correspond to an average loss obtained for a respective batch of non-synthetic speech representations 304 and each of the synthetic speech loss terms ($\mathcal{J}_{tts}(\theta)$) 344, 344a-b may correspond to an average loss obtained for a respective batch of synthetic speech representations 306a, 306b. Further, the model 200 may be trained on corresponding batches of non-synthetic and synthetic speech representations 304, 306a, 306b in parallel such that the supervised loss term module 340 outputs corresponding non-synthetic and synthetic speech loss terms 342, 344a, 344b in parallel In some configurations, the training process 300b further determines, for each training utterance pairing 304, 306b of paired synthetic speech representation 306b paired with a corresponding non-synthetic speech representation 304 of a same corresponding spoken training utterance 305, a consistent loss term ($\mathcal{J}_{cons}(\theta)$) 352 for the corresponding training utterance pairing 304, 306b based on the first probability distribution 311 over possible non-synthetic speech recognition hypotheses and the second probability distribution 312b over possible synthetic speech recognition hypotheses. For instance, the training process 300b may employ a consistent loss term module 350 configured to receive, at each of a plurality of output steps, the corresponding non-synthetic speech and synthetic speech recognition results 311, 312b output by the ASR model 200, and determine the consistency loss term 352 for the corresponding training utterance pairing 304, 306b at the output step.

In some examples, the training process 300b determines the consistent loss term 352 based on a Kuilback-Leibler divergence ($D_{KL}$) between tire first probability distribution 311 over possible non-synthetic speech recognition hypotheses and the second probability distribution 312b over possible synthetic speech recognition hypotheses associated with the corresponding paired synthetic speech representation 306b. Thus, the consistent loss term 352 determined for each training utterance pairing 304, 306b provides an "unsupervised" loss term that is independent of the accuracy of the ASR model 200 (e.g. independent of the supervised loss terms 342, 344), and thus, may be employed to update parameters of the ASR model 200 for promoting consistency between non-synthetic and synthetic speech representations 304, 306b of same spoken training utterances 305. In other words, the consistent loss term 352 permits the ASR model 200 to learn to behave the same, e.g., make consistent predictions on both non-synthetic speech (e.g., real/human speech) and synthetic speech (e.g., synthesized speech) of a same spoken training utterance 305, regardless of whether the spoken training utterance 305 belongs to non-synthetic speech or synthetic speech. In the example shown, the training process 300b is configured to output corresponding non-synthetic and synthetic speech loss terms 342, 344a-b from the supervised loss term module 340 and output the consistent loss term 352 from the unsupervised loss term module 350 in parallel.

In some examples, the training process 300b uses batch training to train the ASR model 200 by training the ASR model 200 on a plurality of training utterance batches. In these examples, each training utterance batch includes a portion of the generated synthetic speech representations 306 and a portion of the non-synthetic speech representations 304 in the set of spoken training utterances 305. The portion of the generated synthetic speech representations 306 may be further divided into unpaired synthetic speech representations 306a and paired synthetic speech representations 306b, in which each paired synthetic speech representation 306b in a given training utterance batch may be paired with a corresponding one of the non-synthetic speech representations 304 of a same corresponding spoken training utterance 305, Each training utterance batch may include a greater proportion of generated synthetic speech representations 306 than non-synthetic speech representations.

The aforementioned data augmentation techniques may be applied to the synthetic speech representations 306 so their acoustics match those of the non-synthetic speech representations 304 under adverse acoustic environments. Moreover, the training process 300b may shuffle the non-synthetic and synthetic speech representations 304, 306 in each training utterance batch.

In some implementations, the training process 300b uses curriculum batch training in which a ratio of the portion of the generated synthetic speech representations 306 to the portion of the non-synthetic speech representations in each training utterance batch increases over time while training the speech recognition model. In these implementations, the ratio increases by increasing the number of impaired synthetic speech representations 306a, i.e., generated from unspoken text utterances 302a, in each training batch. While the training process 300b trains the ASR model 200 on each training utterance batch, the training process 300b generates, at the supervised loss term module 340, a respective non-synthetic speech loss term 342 for each non-synthetic speech representation 304 in the portion of the non-synthetic speech representations for the training utterance hatch.

In some examples, the supervised loss term module 340 applies, to each respective non-synthetic loss term 342, an adjustable weight having a magnitude proportional to the ratio of the portion of the generated speech representations to the portion of the non-synthetic speech representations in the corresponding training utterance batch. Similarly, the training process 300b further generates, at the supervised loss term module 340, a respective synthetic speech loss term 344a, 344b for each synthetic speech representation 306a, 306b in the corresponding training utterance hatch. As with the non-synthetic loss terms 342, the supervised loss term module 340 may further apply, to each respective paired non-synthetic speech loss term 342b, an adjustable weight having a magnitude proportional to the ratio of the portion of the generated speech representations to the portion of the non-synthetic speech representations in the corresponding training utterance batch. Thus, during the curriculum batch training in which the ratio of the portion of the generated synthetic speech representations 306 to the portion of the non-synthetic speech representations in each training utterance batch gradually increases in each subsequent training utterance batch, the weight applied to the loss terms 342, 344b associated with the training utterance pairings 304, 306b also gradually increases in each sub sequent training utterance batch to permit overfitting by the model 200. Similarly, an adjustable weight with a magnitude proportional to this magnitude may be similarly applied to the consistency loss term 352 in each training utterance batch. Notably, the supervised loss term 350 may apply a fixed weight to each respective unpaired non-synthetic speech loss term 342b during the curriculum hatch training despite the proportion of unpaired synthetic speech representations 306a increasing in each subsequent training utterance batch.

Referring to FIG. 3C, JO some implementations, the training process 300c applies conditional GAN-based domain-invariant training to train the ASR model 200. The training process 300c may apply the domain-invariant training in addition to, or in lieu of, the techniques described in FIG. 3A for fine-tuning the parameters of the post-net 316 of the GAN-based TTS model 310 based on the adversarial and consistency loss terms 320, 324. In the example shown, at each of a plurality of output steps for each training text utterance 302 of tire plurality of training text utterances 302 of FIG. 1, an encoder 410 (e.g., encoder 210 of FIG. 2A or encoder 211 of FIG. 2B) at the ASR model 200 encodes each of: the synthetic speeds representation 306 of tire corresponding training text utterance 302 output by the TTS model 310 into a corresponding encoded synthetic speech representation $TTS_{enc}$ (e.g., a synthetic embedding); and one of the non-synthetic speech representations 304 selected from the set of spoken training utterances 305 into a corresponding encoded non-synthetic speech representation Real$_{enc}$ (e.g., a non-synthetic embedding). For output steps when the corresponding training text utterance 302 includes one of the unspoken text utterances 302a, the one of the non-synthetic speech representations 304 input to the encoder 410 is randomly selected from the set of spoken training utterances 305 since the unspoken text utterance 302a is not initially paired with any spoken utterance. By contrast, for output steps when the corresponding training text utterance 302 includes one of the transcriptions 302b in the set of spoken training utterances 305, the one of the non-synthetic speech representations 304 may include a non-synthetic speech representation 304 in the set of spoken training utterances 305 that is paired with the corresponding one of the transcriptions 302b.

The training process 300c determines, using an adversarial discriminator 358, an adversarial loss term 360 between the encoded synthetic speech representation TTS$_{enc}$ and the encoded non-synthetic speech representation Real$_{enc}$. Thereafter, the training process 300c applies the domain-invariant training by updating parameters of the ASR model 200 based on the adversarial loss term 360 determined at each of the plurality of output steps for each training text utterance 302 of the plurality of training text utterances 302, In some implementations, at each of the plurality of output steps for each training text utterance 302, the corresponding training text utterance 302 and the adversarial discriminator 358 is conditioned on the same speaker embedding z as the corresponding training text utterance 302. Conditioning the corresponding training text utterance 302 on a respective speaker embedding z is discussed above with respect to FIG. 3A.

A decoder 420 (e.g., decoder/softmax 240 of FIG. 2A or the decoder 231 of FIG. 2B) decodes the synthetic speech representations 306 and non-synthetic speech representations 304 into corresponding probability distributions 311, 312 as discussed above with reference to FIG. 2B. The shading of the encoder 410 at tire ASR model 200 and the other adversarial discriminator 358 of the GAN depicted in FIG. 3C indicate that these are the only components trained by the domain-invariant training aspect applied by the training process 300c.

Figure 5:
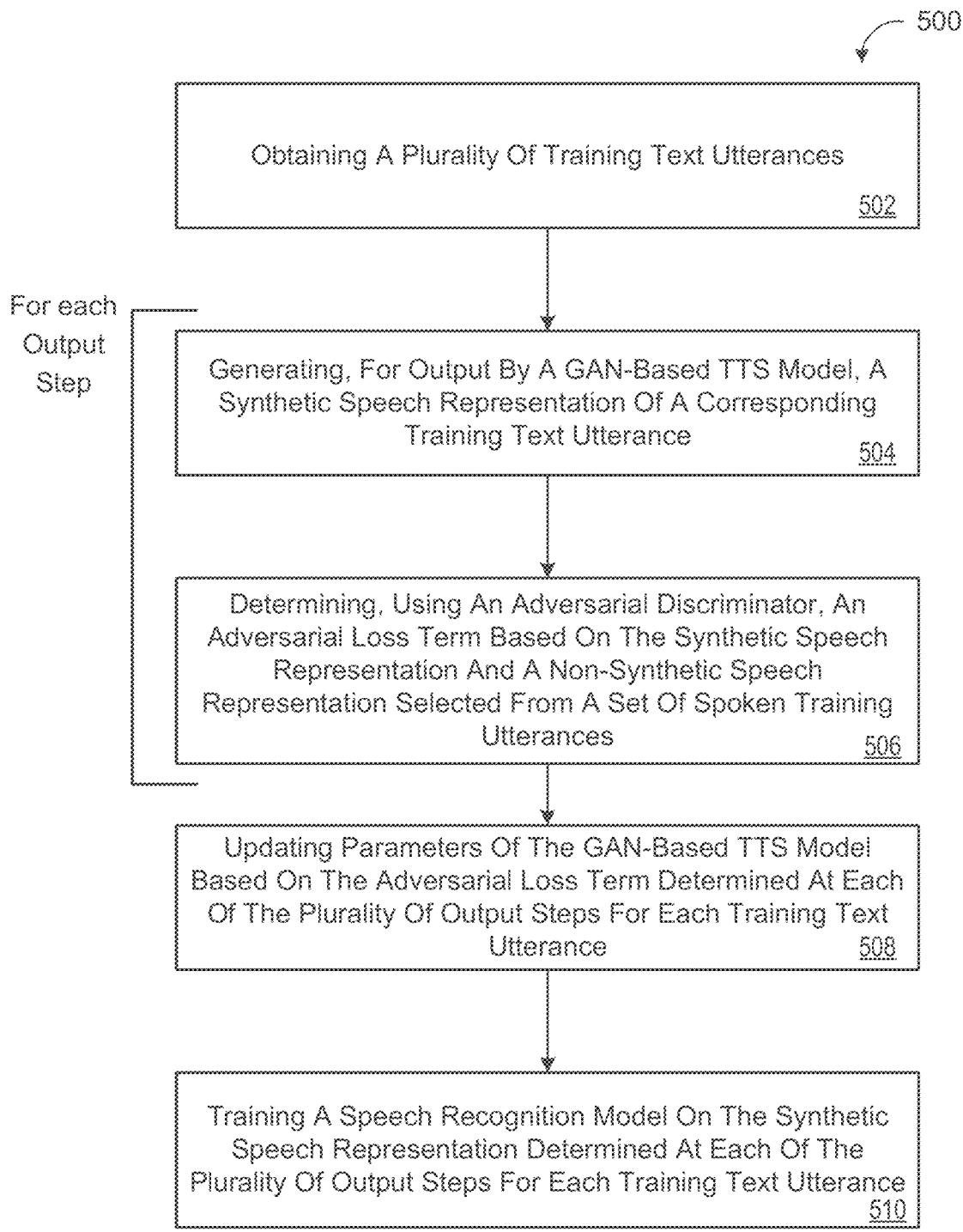
FIG. 5 is a flowchart of an example arrangement of operations for a method of training a generative adversarial network (GAN)-based text-to-speech (TTS) model and a speech recognition model in parallel.

FIG. 5 is a flowchart of an example arrangement of operations for a method 500 of training a generative adversarial network (GAN)-based text-to-speech (TTS) model 310 and a speech recognition model 200 in unison. The flowchart may be described with reference to the training process 300, 300a-c of FIGS. 3A-3C. At operation 502, the method 500 obtains a plurality of training text utterances 302, 302A-N. A first portion of the plurality of training text utterances 302 includes unspoken text utterances 302a that are not pawed with any corresponding spoken utterance. The unspoken text utterances 302a may be selected from a large unspoken text corpus 402 using, tor example, the unspoken text selection process 400 described in FIG. 4. A remaining second portion of the plurality of training text utterances 302 includes transcriptions 302b in a set of spoken training utterances 305. Each spoken training utterance 305 in the set includes a corresponding transcription 302b paired with a corresponding non-synthetic speech representation 304 of the corresponding spoken training utterance 305.

For each of a plurality of output steps for each training text utterance of the plurality of training text utterances 302, the method 500 generates, for output by the GAN-based TTS model 310, a synthetic speech representation 306 of the corresponding training text utterance 302 at operation 504, and at operation 506, the method 500 determines, using an adversarial discriminator 318 of the GAN, an adversarial loss term 320 indicative of an amount of acoustic noise disparity in one of the non-synthetic speech representations 304 selected from the set of spoken training utterances 305 relative to the corresponding synthetic speech representation 306 of the corresponding training text utterance 302. For unpaired synthetic speech representations 306a derived from the first portion of the training text utterances 302 that include the unspoken text utterances 302a, the selected one of the non-synthetic speech representations 304 is randomly selected. For paired synthetic speech representations 306b derived from the second portion of the training text utterances 302 that include the transcriptions 302b in the set of spoken training utterances 305, the selected one of the non-synthetic speech representations 304 is the non-synthetic speech representation 304 in the set of spoken training utterances 305 that is paired with the corresponding transcription 302b.

At operation 508, the method 500 includes updating parameters of the GAN-based TTS model 510 based on the adversarial loss term 320 determined at each of the plurality of output steps for each training text utterance 302 of the plurality of training text utterances 302. Here, updating parameters of the GAN-based TTS model 310 may include updating/fine-tuning parameters of a post-net 316 of the TTS model 310 to produce synthetic speech representations 306 with matching acoustics to that of the non-synthetic speech representations. Notably, data augmentation may be applied to each synthetic speech representation 306 output from the TTS model 510 to further add noise to match acoustics of the non-synthetic speech representations 304. A reference TTS model 322 may be employed to produce reference synthetic speech representations 306ref that may be compared with the synthetic speech representations 306 to determine MSE losses 324 for constraining the post-net 316 to retain linguistic disparity across the synthetic speech representations 306. At operation 510, the method 500 trains the speech recognition model 200 on the synthetic speech representation 306 generated at each of the plurality of output steps for each training text utterance 302 of the plurality of training text utterances A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (FROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
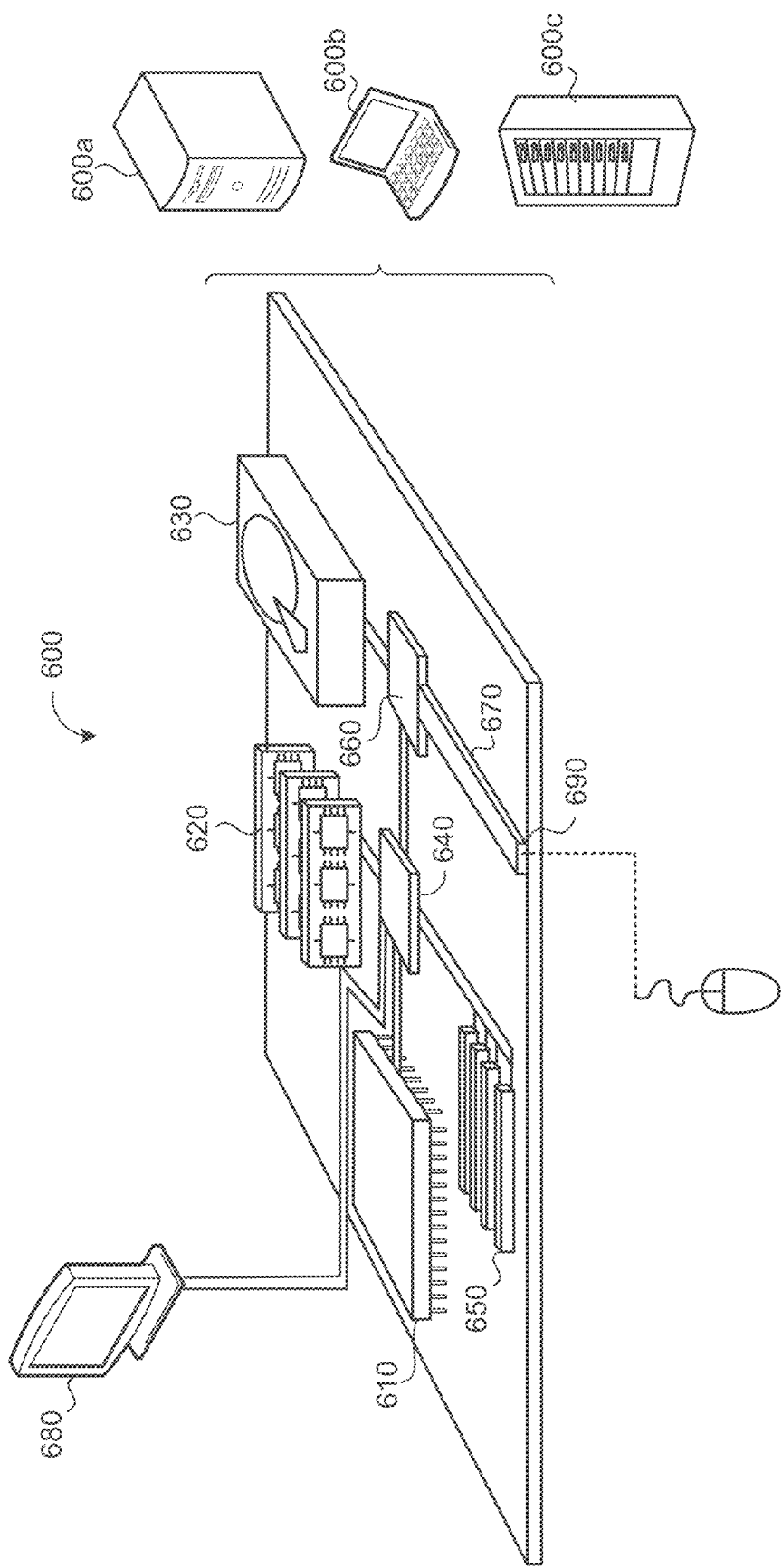
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of tire inventions described and/or claimed in this document.

The computing device 600 includes a processor 610, memory 620, a storage device 630, a high-speed interface/controller 640 connecting to the memory 620 and high-speed expansion ports 660, and a low speed interface/controller 660 connecting to a low speed bus 670 and a storage device 630. Each of the components 610, 620, 630, 640, 660, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUT) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains Instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e g., USB, Bluetooth, Ethernet, wireless Ethernet), may be coupled to one or more input/output devices, such as a keyboard, a pointing device, a scanner, or a networking device such as a switch or router, e g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include ail forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback, and input from the user can be received in any form, including acoustic, speech, or tactile input, in addition, a computer can interact with a user by sending documents to and receiving documents from a device that is used by the user, for example, by sending web pages to a web browser on a users client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for training a generative adversarial network (GAN)-based text-to-speech (TTS) model and a speech recognition model in unison, the method comprising:
    obtaining, by data processing hardware, a plurality of training text utterances, wherein:
        a first portion of the plurality of training text utterances comprises unspoken text utterances, each unspoken text utterance not paired with any corresponding spoken utterance; and
        a remaining second portion of the plurality of training text utterances composes transcriptions in a set of spoken training utterances, each spoken training utterance comprising a corresponding transcription paired with a corresponding non-synthetic speech representation of the corresponding spoken training utterance;
    at each of a plurality of output steps for each training text utterance of the plurality of training text utterances:
        generating, by the data processing hardware, for output by the GAN-based TTS model, a synthetic speech representation of the corresponding training text utterance; and
        determining, by the data processing hardware, using an adversarial discriminator of the GAN, an adversarial loss term indicative of an amount of acoustic noise disparity in one of the non-synthetic speech representations selected from the set of spoken training utterances relative to the corresponding synthetic speech representation of the corresponding training text utterance;
    updating, by the data processing hardware, parameters of the GAN-based TTS model based on the adversarial loss term determined at each of the plurality of output steps for each training text utterance of the plurality of training text utterances; and
    training, by the data processing hardware, the speech recognition model on the synthetic speech representation generated at each of the plurality of output steps for each training text utterance of the plurality of training text utterances.

2. The method of claim 1, wherein training the speech recognition model further comprises training the speech recognition model on training utterance batches, each training utterance batch comprising:
    a portion of the generated synthetic speech representations of the corresponding training text utterances, and
    a portion of the non-synthetic speech representations in the set of spoken training utterances.

3. The method of claim 2, wherein a ratio of the portion of the generated synthetic speech representations to the portion of the non-synthetic speech representations in each training utterance batch increases over time while training the speech recognition model.

4. The method of claim 3, further comprising, while training the speech recognition model on each training utterance batch:
    generating, by the data processing hardware, a respective non-synthetic speech loss term for each non-synthetic speech representation in the portion of the non-synthetic speech representations for the corresponding training utterance batch; and
    applying, by the data processing hardware, an adjustable loss weight to each respective non-synthetic speech loss term generated by the speech recognition model, the adjustable loss weight having a magnitude proportional to the ratio of the portion of the generated speech representations to the portion of the non-synthetic speech representations in the corresponding training utterance batch.

5. The method of claim 2, further comprising, while training the speech recognition model on each training utterance batch:
    at each of a plurality of output steps for each generated synthetic speech representation in the portion of the generated synthetic speech representations associated with the corresponding training utterance batch:
        determining, by the data processing hardware, for output by the speech recognition model, a first probability distribution over possible synthetic speech recognition hypotheses for the corresponding synthetic speech representation; and
        generating, by the data processing hardware, a synthetic speech loss term based on the first probability distribution over possible synthetic speech recognition hypotheses for the corresponding synthetic speech representation and the corresponding training text utterance from which the corresponding synthetic speech representation is generated; and
    at each of a plurality of output steps for each non-synthetic speech representation in the portion of the non-synthetic speech representations associated with the corresponding training utterance batch:
        determining, by the data processing hardware, for output by the speech recognition model, a second probability distribution over possible non-synthetic speech recognition hypotheses for the corresponding non-synthetic speech representation; and
        generating, by the data processing hardware, a non-synthetic speech loss term based on the second probability distribution over possible non-synthetic speech recognition hypotheses for the corresponding non-synthetic speech representation and the transcription in the set of spoken training utterances that is paired with the corresponding non-synthetic speech representation.

6. The method of claim 1, wherein, at each of the plurality of output steps for each training text utterance of the plurality of training text utterances, the one of the non-synthetic speech representations selected from the set of spoken training utterances comprises:
when the corresponding training text utterance comprises one of the unspoken text utterances in the first portion of the plurality of training text utterances, a randomly selected non-synthetic speech representation from the set of spoken training utterances; or
when the corresponding training text utterance comprises one of the transcriptions in the second portion of the plurality of training text utterances, a non-synthetic speech representation from the set of spoken training utterances that is paired with the corresponding one of the transcriptions.

7. The method of claim 1, wherein each training text utterance is conditioned on:
an utterance embedding selected from a set of utterance embeddings, each utterance embedding in the set of utterance embeddings representing an intended prosody; and
a speaker embedding selected from a set of speaker embeddings, each speaker embedding in the set of speaker embeddings representing speaker characteristics.

8. The method of claim 7, wherein:
each training text utterance is represented by a corresponding sequence of phonemes;
each utterance embedding in the set of utterance embeddings is extracted from a corresponding one of the transcriptions in the set of spoken training utterances by a variational autoencoder (VAE); and
each speaker embedding in the set of speaker embeddings is extracted from a corresponding one of the non-synthetic speech representations in the set of spoken training utterances.

9. The method of claim 1, further comprising, prior to determining the adversarial loss term at each of the plurality of output steps for each training text utterance of the plurality of training text utterances, applying, by the data processing hardware, data augmentation to the corresponding generated synthetic speech representation of the corresponding training text utterance.

10. The method of claim 9, wherein the applied data augmentation comprises at least one of adding noise, adding reverberation, or manipulating timing.

11. The method of claim 1, further comprising, at each of the plurality of output steps for each training text utterance of the plurality of training text utterances:
generating, by the data processing hardware, for output by a reference TTS model, a reference synthetic speech representation of the corresponding training text utterance; and
determining, by the data processing hardware, a consistency loss term based on the synthetic speech representation of the corresponding training text utterance output by the GAN-based TTS model and the reference synthetic speech representation of the corresponding training text utterance output by the reference TTS model,
wherein updating the parameters of the GAN-based TTS model is based on the adversarial loss term and the consistency loss term determined at each of the plurality of output steps for each training text utterance of the plurality of unspoken training utterances.

12. The method of claim 11, wherein parameters of the reference TTS model remain fixed at each of the plurality of output steps for each training text utterance of the plurality of training text utterances.

13. The method of claim 1, further comprising executing, by the data processing hardware, an unspoken text selection process to obtain the unspoken text utterances in the first portion of the plurality of training text utterances, wherein the text selection process is configured to:
obtain a corpus of unspoken text utterances;
for each unspoken text utterance in the corpus of unspoken text utterances:
determine a first probability associated with the unspoken text utterance appearing in a domain-specific language model, the domain-specific language model trained on each transcription in the set of spoken training utterances;
determine a second probability associated with the unspoken text utterance appearing in a background language model, the background language model trained on every unspoken text utterance in the corpus of unspoken text utterances, and
determine a score based on the first probability, the second probability, and a number of words appearing in the corresponding unspoken text utterance; and
select, as the unspoken text utterances in the first portion of the plurality of training text utterances, the unspoken text utterances in the corpus of unspoken text utterances that have the N-best utterance scores.

14. The method of claim 1, wherein training the speech recognition model comprises, at each of the plurality of output steps for each training text utterance of the plurality of training text utterances:
encoding, by the speech recognition model, the synthetic speech representation of the corresponding training text utterance output by the GAN-based TTS model;
encoding, by the speech recognition model, one of the non-synthetic speech representations selected from the set of spoken training utterances;
determining, using another adversarial discriminator, another adversarial loss term between the encoded synthetic speech representation and the encoded one of the non-synthetic speech representations; and
updating parameters of the speech recognition model based on the other adversarial loss term determined at each of the plurality of output steps for each training text utterance of the plurality of training text utterances.

15. The method of claim 14, wherein, at each of the plurality of output steps for each training text utterance of the plurality of training text utterances:
the corresponding text utterance and the another adversarial discriminator are each conditioned on a same speaker embedding selected from a set of speaker embeddings, each speaker embedding in the set of sneaker embeddings representing speaker characteristics; and
the one of the non-synthetic speech representations selected from the set of spoken training utterances comprises:
when the corresponding training text utterance comprises one of the unspoken text utterances in the first portion of the plurality of training text utterances, a randomly selected non-synthetic speech representation from the set of spoken training utterances; or
when the corresponding training text utterance comprises one of the transcriptions in the second portion of the plurality of training text utterances, a non-synthetic speech representation from the set of spoken training utterances that is paired with the corresponding one of the transcriptions.

16. A system for training a generative adversarial network (GAN)-based text-to-speech (TTS) model and a speeds recognition model in unison, the system comprising:
data processing hardware; and
memory hardware in communication with the data processing hardware, the memory hardware storing instructions that when executed on the data processing hardware cause the data processing hardware to perform operations comprising:
obtaining a plurality of training text utterances, wherein:
a first portion of the plurality of training text utterances comprises unspoken text utterances, each unspoken text utterance not paired with any corresponding spoken utterance; and
a remaining second portion of the plurality of training text utterances composes transcriptions in a set of spoken training utterances, each spoken training utterance comprising a corresponding transcription paired with a corresponding non-synthetic speech representation of the corresponding spoken training utterance;
at each of a plurality of output steps for each training text utterance of the plurality of training text utterances:
generating, for output by the GAN-based TTS model, a synthetic speech representation of the corresponding training text utterance; and
determining, using an adversarial discriminator of the GAN, an adversarial loss term indicative of an amount of acoustic noise disparity in one of the non-synthetic speech representations selected from the set of spoken training utterances relative to the corresponding synthetic speech representation of the corresponding training text utterance; and
updating parameters of the GAN-based TTS model based on the adversarial loss term determined at each of the plurality of output steps for each training text utterance of the plurality of training text utterances; and
training the speech recognition model on the synthetic speech representation generated at each of the plurality of output steps for each training text utterance of the plurality of training text utterances.

17. The system of claim 16, wherein training the speech recognition model further comprises training the speech recognition model on training utterance batches, each training utterance batch comprising:
a portion of the generated synthetic speech representations of the corresponding training text utterances; and
a portion of the non-synthetic speech representations in the set of spoken training utterances.

18. The system of claim 17, wherein a ratio of the portion of the generated synthetic speech representations to the portion of the non-synthetic speech representations in each training utterance batch increases over time while training the speech recognition model.

19. The system of claim 18, wherein the operations further comprise, while training the speech recognition model on each training utterance batch:
generating a respective non-synthetic speech loss term for each non-synthetic speech representation in the portion of the non-synthetic speech representations for the corresponding training utterance batch; and
applying an adjustable loss weight to each respective non-synthetic speech loss term generated by the speech recognition model, the adjustable loss weight having a magnitude proportional to the ratio of the portion of the generated speech representations to the portion of the non-synthetic speech representations in the corresponding training utterance batch.

20. The system of claim 17, wherein the operations further comprise, while training the speech recognition model on each training utterance batch:
at each of a plurality of output steps for each generated synthetic speech representation in the portion of the generated synthetic speech representations associated with the corresponding training utterance batch:
determining, for output by the speech recognition model, a first probability distribution over possible synthetic speech recognition hypotheses for the corresponding synthetic speech representation; and
generating a synthetic speech loss term based on the first probability distribution over possible synthetic speech recognition hypotheses for the corresponding synthetic speech representation and the corresponding training text utterance from which the corresponding synthetic speech representation is generated; and
at each of a plurality of output steps for each non-synthetic speech representation in the portion of the non-synthetic speech representations associated with the corresponding training utterance batch:
determining, for output by the speech recognition model, a second probability distribution over possible non-synthetic speech recognition hypotheses for the corresponding non-synthetic speech representation; and generating a non-synthetic speech loss term based on the second probability distribution over possible non-synthetic speech recognition hypotheses for the corresponding non-synthetic speech representation and the transcription in the set of spoken training utterances that is paired with the corresponding non-synthetic speech representation.

21. The system of claim 16, wherein, at each of the plurality of output steps for each training text utterance of the plurality of training text utterances, the one of the non-synthetic speech representations selected from the set of spoken training utterances comprises:

when the corresponding training text utterance comprises one of the unspoken text utterances in the first portion of the plurality of training text utterances, a randomly selected non-synthetic speech representation from the set of spoken training utterances; or when the corresponding training text utterance comprises one of the transcriptions in the second portion of the plurality of training text utterances, a non-synthetic speech representation from the set of spoken training utterances that is paired with the corresponding one of the transcriptions.

22. The system of claim 16, wherein each training text utterance is conditioned on:

an utterance embedding selected from a set of utterance embeddings, each utterance embedding in the set of utterance embeddings representing an intended prosody; and a speaker embedding selected from a set of speaker embeddings, each speaker embedding in the set of speaker embeddings representing speaker characteristics.

23. The system of claim 22, wherein:

each training text utterance is represented by a corresponding sequence of phonemes;

each utterance embedding in the set of utterance embeddings is extracted from a corresponding one of the transcriptions in the set of spoken training utterances by a variational autoencoder (VAE); and each speaker embedding in the set of speaker embeddings is extracted from a corresponding one of the non-synthetic speech representations in the set of spoken training utterances.

24. The system of claim 16, wherein the operations further comprise, prior to determining the adversarial loss term at each of the plurality of output steps for each training text utterance of the plurality of training text utterances, applying data augmentation to the corresponding generated synthetic speech representation of the corresponding training text utterance.

25. The system of claim 24, wherein the applied data augmentation comprises at least one of adding noise, adding reverberation, or manipulating timing.

26. The system of claim 16, wherein the operations further comprise, at each of the plurality of output steps for each training text utterance of the plurality of training text utterances:

generating, for output by a reference TTS model, a reference synthetic speech representation of the corresponding training text utterance; and determining a consistency loss term based on the synthetic speech representation of the corresponding training text utterance output by the GAN-based TTS model and the reference synthetic speech representation of the corresponding training text utterance output by the reference TTS model, wherein updating the parameters of the GAN-based TTS model is based on the adversarial loss term and the consistency loss term determined at each of the plurality of output steps for each training text utterance of the plurality of unspoken training utterances.

27. The system of claim 26, wherein parameters of the reference TTS model remain fixed at each of the plurality of output steps for each training text utterance of the plurality of training text utterances.

28. The system of claim 16, wherein the operations further comprise executing an unspoken text selection process to obtain the unspoken text utterances in the first portion of the plurality of training text utterances, wherein the text selection process is configured to:

obtain a corpus of unspoken text utterances;

for each unspoken text utterance in the corpus of unspoken text utterances:

determine a first probability associated with the unspoken text utterance appearing in a domain-specific language model, the domain-specific language model trained on each transcription in the set of spoken training utterances;

determine a second probability associated with the unspoken text utterance appearing in a background language model, the background language model trained on every unspoken text utterance in the corpus of unspoken text utterances; and determine a score based on the first probability, the second probability, and a number of words appearing in the corresponding unspoken text utterance; and select, as the unspoken text utterances in the first portion of the plurality of training text utterances, the unspoken text utterances in the corpus of unspoken text utterances that have the N-best utterance scores.

29. The system of claim 16, wherein training the speech recognition model comprises, at each of the plurality of output steps for each training text utterance of the plurality of training text utterances:

encoding, by the speech recognition model, the synthetic speech representation of the corresponding training text utterance output by the GAN-based TTS model;

encoding, by the speech recognition model, one of the non-synthetic speech representations selected from the set of spoken training utterances;

determining, using another adversarial discriminator, another adversarial loss term between the encoded synthetic speech representation and the encoded one of the non-synthetic speech representations; and updating parameters of the speech recognition model based on the other adversarial loss term determined at each of the plurality of output steps for each training text utterance of the plurality of training text utterances.

30. The system of claim 29, wherein, at each of the plurality of output steps for each training text utterance of tire plurality of training text utterances:

the corresponding text utterance and the another adversarial discriminator are each conditioned on a same speaker embedding selected from a set of speaker embeddings, each speaker embedding in the set of speaker embeddings representing speaker characteristics; and the one of the non-synthetic speech representations selected from the set of spoken training utterances comprises:
- when the corresponding training text utterance comprises one of the unspoken text utterances in the first portion of the plurality of training text utterances, a randomly selected non-synthetic speech representation from the set of spoken training utterances; or
- when the corresponding training text utterance comprises one of the transcriptions in the second portion of the plurality of training text utterances, a non-synthetic speech representation from the set of spoken training utterances that is paired with the corresponding one of the transcriptions.

* * * * *